US009024642B2

(12) United States Patent
Lu

(10) Patent No.: US 9,024,642 B2
(45) Date of Patent: May 5, 2015

(54) ABSOLUTE POSITION MEASUREMENT CAPACITIVE GRATING DISPLACEMENT MEASUREMENT METHOD, SENSOR, AND OPERATING METHOD THEREOF

(75) Inventor: Quhui Lu, Guilin (CN)

(73) Assignee: Guilin Measuring Instrument Co., Ltd., Guilin (CN)

( * ) Notice: Subject to any disclaimer, the term of this patent is extended or adjusted under 35 U.S.C. 154(b) by 396 days.

(21) Appl. No.: 13/125,528

(22) PCT Filed: Feb. 14, 2011

(86) PCT No.: PCT/CN2011/070977
§ 371 (c)(1),
(2), (4) Date: Jun. 8, 2012

(87) PCT Pub. No.: WO2012/022141
PCT Pub. Date: Feb. 23, 2012

(65) Prior Publication Data
US 2013/0009652 A1 Jan. 10, 2013

(30) Foreign Application Priority Data
Aug. 14, 2010 (CN) .......................... 2010 1 0254159

(51) Int. Cl.
G01B 7/14 (2006.01)
G01D 5/241 (2006.01)

(52) U.S. Cl.
CPC .................................... G01D 5/2415 (2013.01)

(58) Field of Classification Search
None
See application file for complete search history.

(56) References Cited

U.S. PATENT DOCUMENTS 4,878,013 A * 10/1989 Andermo ....................... 324/690
4,961,055 A    10/1990 Habib et al.
5,053,715 A * 10/1991 Andermo ....................... 324/662

FOREIGN PATENT DOCUMENTS

CN    1039301    1/1990
CN    1067311    12/1992

(Continued)

OTHER PUBLICATIONS

International Search Report for international application No. PCT/CN2011/070977, dated May 19, 2011 (5 pages).

Primary Examiner — Melissa Koval
Assistant Examiner — Courtney McDonnough
(74) Attorney, Agent, or Firm — Hamre, Schumann, Mueller & Larson, P.C.

(57) ABSTRACT

An absolute position measurement capacitive grating displacement measurement method, a sensor, and an operating method of the sensor are provided. In the measurement method, a drive signal having wave properties is used to excite a transmission grating, and displacement of a measured position in each wavelength is transformed into an initial phase of a time fundamental wave. The displacement of the measured position in each wavelength is acquired through an addition counter. A signal having wave properties output by a drive signal generator of the sensor is connected to a transmission grating, the master clock of an oscillator is connected to each circuit, an output of a reception grating is connected to a synchronous capture circuit through a signal selection switch and an analog processing circuit; and the synchronous capture circuit is connected to a controller, an addition counter, and a Random Access Memory (RAM). The controller is connected to all components. In the operating method of the sensor, an interface unit starts a measurement unit, a controller coordinates operation of all circuits, and after measurement of displacements in coarse, medium, and fine wavelengths is successively completed, the interface unit turns off the measurement unit, performs processing, and displays the measurement result. The circuits are simple, easy to control, and easy to be realized, and have high precision.

9 Claims, 10 Drawing Sheets

(56) References Cited

FOREIGN PATENT DOCUMENTS

| CN | 1086309 | 5/1994 |
| CN | 1386187 | 12/2002 |
| CN | 101206126 | 6/2008 |
| CN | 101949682 | 1/2011 |
| JP | 2001-4402 | 1/2001 |

* cited by examiner

ABSOLUTE POSITION MEASUREMENT CAPACITIVE GRATING DISPLACEMENT MEASUREMENT METHOD, SENSOR, AND OPERATING METHOD THEREOF

BACKGROUND OF THE INVENTION

1. Field of the Invention

The present invention relates to the capacitive displacement measurement technology, and more particularly to an absolute position measurement capacitive grating displacement measurement method, a sensor, and an operating method thereof.

2. Related Art

A capacitive grating displacement sensor is widely applied in the fields of linear/angular displacement measurement due to the characteristics thereof such as a low cost, a small size, and low power consumption. In terms of the realization principle, current capacitive grating displacement sensors are categorized into relative position measurement (an incremental type) capacitive grating displacement sensors and absolute position measurement (an absolute type) capacitive grating displacement sensors. The incremental type capacitive grating displacement sensor has been applied for about thirty years, and in this kind of sensors, a displacement amount needs to be rapidly accumulated, resulting in two defects: a measurement speed limit (lower than 1.5 m/s @150 KHz) and uninterruptible measurement (so further decrease of a working current is limited), such that the incremental type capacitive grating displacement sensor is gradually phased out. The absolute type capacitive grating displacement sensor is initiated by a Japanese company named Mitutoyo, and the implementation method thereof may be referred to patents CN89106051, U.S. Pat. No. 5,053,715, CN92101246, and CN93117701. This kind of sensor uses two or more code channels (wavelengths) to perform absolute positioning, so the requirement for rapid accumulation of a displacement amount is eliminated, and the work is in an intermittent measurement state (approximately 8 times per second), thereby overcoming the main defects of the incremental measurement. However, the existing absolute type capacitive grating displacement sensor has the following defects.

1. A sensor drive signal is a static (irrelevant to time) and spatially distributed waveform. A demodulated received signal is irrelevant to time (a direct current (DC) signal), and a harmonic effect cannot be alleviated through signal processing technologies.

2. In order to downsize a harmonic component, a sine waveform electrode that is difficult to make is required to be used.

3. Analog-to-digital (A/D) conversion of two orthogonal signals is required to be performed to determine a displacement amount in each wavelength.

4. An arctg operation is required to be performed to determine a displacement amount in each wavelength, which exceeds a real-time processing capability of a common Micro Controller Unit (MCU). In order to reduce a processing load of the MCU, linear approximation has to be adopted.

5. In order to reduce a linear approximation error, a sensor drive signal is required to be probed repeatedly to make a received signal close to a zero point.

6. In order to reduce the linear approximation error and a harmonic component effect, a relatively small fine wavelength (1.024 mm when the resolution is 0.01 mm) is required to be used.

7. The determination of the displacement amounts in all wavelengths hampers and influences each other, and during rapid movement, the algorithm does not converge.

In conclusion, the existing absolute type capacitive grating displacement sensor requires an MCU to be a core, software is based on an inefficient probing method, and peripheries require support of technologies such as complicated A/D conversion and a sine waveform electrode. Although a regular Single Chip Microcomputer (SCM) can indeed meet the aforementioned requirements on software and hardware, it is not easy to integrally install the system (made into a single-chip Application-Specific Integrated Circuit (ASIC)) on a handheld measurement tool to obtain a product that has a low cost, a small volume, low power consumption, and is suitable for mass production at the same time.

Patent ZL200710050658 introduces a round grating sensor for absolute position measurement, and the patented solution is applicable to angle measurement in a large distributed space. But an SCM is used for performing secondary processing on measurement results of two independent incremental type capacitive grating systems, which makes the cost, size, and power consumption several times as those of a normal incremental type capacitive grating system. Although functions of the incremental type capacitive grating system are extended, but inherent defects of the incremental type measurement are not solved.

SUMMARY OF THE INVENTION

The present invention provides an absolute position measurement capacitive grating displacement measurement method. A sensor drive signal having wave properties is changed into a received signal changing periodically with time after capacitive coupling of a transmission grating and a reflection grating, pitch conversion of the reflection grating and a conversion grating, and capacitive coupling of the conversion grating and a reception grating, and displacement of a measured position in each wavelength is transformed into an initial phase of a time fundamental wave of a received signal. The time difference between a negative-to-positive zero-crossing point of the fundamental wave signal and a preset phase zero point is the displacement of the measured position in a measured wavelength. The time difference is acquired by counting with an addition counter, so the displacement of the measured position in the measured wavelength is acquired.

The present invention also provides an absolute position measurement capacitive grating displacement sensor using the absolute position measurement capacitive grating displacement measurement method of the present invention and an operating method thereof. The capacitive grating displacement sensor has a conversion grating and a reception grating for realizing multi-wavelength positioning. With excitation of a drive signal having wave properties, a measured position is changed into an initial phase of a sine wave, and displacement of the measured position in each wavelength is acquired with an addition counter. The circuit is simple and easy to be integrated, and low-cost mass production thereof can be realized.

In the absolute position measurement capacitive grating displacement measurement method of the present invention, a drive signal having wave properties is used to excite each electrode of a transmission grating, and is changed into a received signal changing periodically with time after capacitive coupling of the transmission grating and a reflection grating, pitch conversion of the reflection grating and a conversion grating, and capacitive coupling of the conversion grating and a reception grating; and displacement of a measured position in each wavelength is transformed into an initial phase of a time fundamental wave of a received signal. The time difference between a negative-to-positive zero-crossing point of the fundamental wave signal and a preset phase zero point is the displacement of the measured position in a measured wavelength. The time difference is acquired by counting with an addition counter, so the displacement of the measured position in the measured wavelength is acquired.

An absolute position measurement capacitive grating displacement sensor designed by adopting the absolute position measurement capacitive grating displacement measurement method of the present invention includes a transmission board and a reflection board capable of moving relative to each other and a measurement circuit. At least one of the transmission board and the reflection board can move along a measurement axis. A column of periodically arranged electrodes are disposed on the transmission board in a measurement axis direction, which are the transmission grating. A column of periodically arranged electrodes are disposed on the reflection board in the measurement axis direction, which are the reflection grating. The capacitive coupling between the transmission grating and the reflection grating changes accordingly with change of the relative position of the transmission board and the reflection board.

Two columns of periodically arranged electrodes orderly connected to the reflection grating are further disposed on the reflection board, which form the conversion grating for generating required measurement wavelengths. Two columns of periodically arranged electrodes for capacitive coupling with the conversion grating are further disposed on the transmission board, which form the reception grating for generating a received signal reflecting displacement of a measured position in each wavelength.

Each N transmission grating electrodes form a group, N is an integer, 3≤N≤16, and N is usually 8. The electrodes are periodically arranged at intervals of $P_t/N$. A pitch of a group of N transmission grating electrodes is $P_t$. $P_t$ is $N_t$ times of a fine wavelength $W_f$, and $N_t$ is an odd number between 3 and 7. The requirements of both signal synthesis and wavelength conversion are taken into consideration, preferably $N_t=3$, that is, $P_t=3W_f$.

The reflection grating electrodes on the reflection board are divided into two groups which are alternately and periodically arranged at intervals of $P_r$, and $P_r=W_f$. The conversion grating electrodes on the reflection board are arranged along the measurement axis at respective intervals periodically. The two groups of reflection grating electrodes are orderly connected to the two columns of conversion grating electrodes respectively through wires.

The electrodes of the transmission grating, reception grating, reflection grating, and conversion grating may be rectangular, triangular, and in a sine wave shape, and are normally rectangular that can be easily fabricated. The electrodes of each column are arranged according to a common base line, and the base line at a central area is preferably selected for ease of wiring.

The electrodes of the transmission grating, reception grating, reflection grating, and conversion grating are arranged circumferentially in a concentric manner, and the pitch of the electrodes is calculated according to angles. Relative displacement between the transmission board and the reflection board is relative rotation of the transmission board and the reflection board with the base point being the center of the concentric circles, so that the present invention is applicable to angular displacement measurement.

The measurement circuit of the absolute position measurement capacitive grating displacement sensor of the present invention includes an interface unit and a measurement unit. The measurement unit includes a drive signal generator and a signal processing circuit. The interface unit includes a timer, a keyboard interface circuit, a measurement interface circuit, a display drive circuit, and an Arithmetic Logic Unit (ALU).

The measurement unit further includes an oscillator, a frequency divider, and a controller. The drive signal generator is a drive signal generator for generating a sensor drive signal having wave properties. A master clock output by the oscillator of the measurement unit is connected to the drive signal generator through the frequency divider. N output signals having wave properties generated by the drive signal generator are respectively connected to N electrodes of each of the groups of the transmission gratings.

The signal processing circuit of the measurement unit of the present invention includes an analog processing circuit, a zero-crossing detection circuit, a synchronous delay circuit, an addition counter, a synchronous capture circuit, and a Random Access Memory (RAM). The analog processing circuit includes a signal selection switch group, a differential amplifier, a synchronous demodulation circuit, and a low-pass filter. Two outputs of the reception gratings of the measured wavelength are connected to the differential amplifier through the signal selection switch group, and after differential amplification, are successively connected to the synchronous demodulation circuit, the low-pass filter, and the zero-crossing detection circuit, and then are input into the synchronous capture circuit.

The master clock output by the oscillator is further connected to the controller, the synchronous demodulation circuit, the synchronous capture circuit, and the addition counter. A phase synchronization signal from the drive signal generator is connected to the synchronous delay circuit.

An output of the synchronous delay circuit is connected to the synchronous capture circuit and the addition counter. An output of the zero-crossing detection circuit is connected to the synchronous capture circuit. An output of the synchronous capture circuit is connected to the controller and the RAM. An output of the addition counter serves as a data input of the RAM.

The measurement interface circuit of the interface unit is connected to the controller of the measurement unit and the RAM.

The controller generates various control signals including an initialization signal, a displacement measurement signal, a memory address signal, and a processing request signal. Each the output is respectively connected to the RAM, the drive signal generator, the signal selection switch group, and the measurement interface circuit of the interface unit. An input terminal of the controller is connected to an output terminal of the synchronous capture circuit, and an input clock thereof is connected to the master clock output by the oscillator.

The drive signal generator of the measurement unit of the present invention may adopt a twisted-ring counter solution, and mainly include a twisted-ring counter, a drive sequence selection switch, and an XOR modulator. An output of the oscillator passes through the frequency divider, and is then connected to the drive signal generator to serve as the input clock of the twisted-ring counter and the XOR modulator. The twisted-ring counter generates N output signals having wave properties, and the N output signals having wave properties are input into the XOR modulator through the drive sequence selection switch to form two drive signal application orders required by coarse/medium wavelength and fine wavelength measurement. N outputs of the XOR modulator are connected to the N electrodes of all groups of the transmission gratings.

The drive signal generator of the measurement unit of the present invention may also adopt a ROM solution, and mainly includes an address addition counter, a ROM, and the XOR modulator. The master clock output by the oscillator passes through the frequency divider, and is then connected to the address addition counter to serve as a counting clock of the address addition counter. An output of the address addition counter and the fine wavelength measurement signal together form a read address of the ROM. N-bit data output by the ROM is input into the XOR modulator. After XOR modulation, the N outputs are connected to the N electrodes of all groups of the transmission gratings.

According to an expected maximum measurement range, two wavelengths or three wavelengths may be selected for measurement. When three wavelengths are used for measurement, two columns of conversion gratings and two columns of reception gratings are respectively disposed. The two columns of conversion gratings of the reflection board are respectively called a medium wavelength conversion grating and a coarse wavelength conversion grating. The two columns of reception gratings of the corresponding transmission boards are respectively called a medium wavelength reception grating and a coarse wavelength reception grating. The medium wavelength conversion grating electrodes on the reflection board are arranged along the measurement axis at intervals of $P_m$ periodically. The pitch $P_m$ of the medium wavelength conversion grating is smaller than a pitch $P_r$ of the reflection grating. According to the electrode arrangement and excitation method, it can be acquired that the medium wavelength $W_m$ satisfies $W_m=P_r P_m/(P_r-P_m)$. It is assumed that $W_m=N_m W_f$, $P_t=N_t W_f$, $N_m$ is an integer, and $N_t$ is an odd number between 3 and 7, so $P_m=N_m W_f/(N_m+N_t)$, and when $N_m=16$ and $N_t=3$, $P_m=16 W_f/19$. The medium wavelength reception grating electrodes on the corresponding transmission boards are divided into two identical groups, which are arranged along the measurement axis at intervals of $N_t P_m$ alternately and periodically, and the reception grating electrodes of the same group are connected to each other by wires. The layout of the electrodes of the coarse wavelength conversion grating and the coarse wavelength reception grating is similar to that of the medium wavelength. It is assumed that the coarse wavelength $W_c$ satisfies $W_c=N_c W_f$, $P_t=N_t W_f$, $N_c$ is an integer, and $N_t$ is an odd number between 3 and 7, so the pitch $P_c$ of the coarse wavelength conversion grating electrodes satisfies $P_c=N_c W_f/(N_c+N_t)$, and when $N_c=256$ and $N_t=3$, $P_c=256 W_f/259$. The coarse wavelength reception grating electrodes are also divided into two identical groups arranged at intervals of $N_t P_c$ alternately and periodically, and the reception grating electrodes of the same group are connected to each other by wires.

When two wavelengths are used for measurement, also two pairs of the conversion gratings and the reception gratings are disposed. The layout of the electrodes is similar to that of the three-wavelength measurement, and only the original medium wavelength conversion grating and medium wavelength reception grating are changed into a fine wavelength auxiliary conversion grating and a fine wavelength auxiliary reception grating.

An operating method of an absolute position measurement capacitive grating displacement sensor of the present invention is as follows.

The interface unit starts the measurement unit according to a preset measurement frequency. A drive signal having wave properties is changed into a received signal changing periodically with time (after synchronous demodulation) after capacitive coupling of the transmission grating and the reflection grating, pitch conversion of the reflection grating and the conversion grating, and capacitive coupling of the conversion grating and a reception grating. Displacement of a measured position in each wavelength is transformed into an initial phase of a time fundamental wave of the received signal (after synchronous demodulation).

The two received signals output by the reception grating electrodes of each wavelength are input into the differential amplifier through the signal selection switch group. After differential amplification, the signals successively pass through the synchronous demodulation circuit, the low-pass filter, and the zero-crossing detection circuit to be processed to generate a square-wave signal. The synchronous capture circuit generates a synchronous capture signal according to the square-wave signal and the output of the synchronous delay circuit, captures a counting result of the addition counter at a non-counting edge of the master clock, and writes the result into a designated unit of the RAM. The controller uses the synchronous capture signal to generate the control signal required for measuring the displacement in the next wavelength, or requests the interface unit to perform subsequent processing.

The synchronous delay circuit controls the counting of the addition counter. Only after a valid drive signal is applied for a preset time and at a preset phase of the drive signal, that is, a preset phase zero point, the addition counter is allowed to start counting. The addition counter performs counting on the master clock output by the oscillator.

The controller (a state machine) generates various control signals including the initialization signal, the fine wavelength displacement measurement signal, the medium wavelength displacement measurement signal, the coarse wavelength displacement measurement signal, the memory address signal, and the processing request signal, so as to coordinate the operation of the measurement circuit or request the interface unit to perform subsequent processing.

After the measurement unit successively completes the measurement of the displacements of the measured position in the coarse wavelength, the medium wavelength, and the fine wavelength, the controller requests the interface unit to perform the subsequent processing. The interface unit turns off the measurement unit immediately after reading the value of the displacement in each the wavelength from the RAM of the measurement unit, calculates an absolute position according the value of the displacement in each wavelength, performs other conventional processing (such as measurement unit conversion and measurement reference point setting) according to requirements (input through a keyboard) of a user, and drives the Liquid Crystal Display (LCD) to display the measurement result.

An operating method of an absolute position measurement capacitive grating displacement sensor of the present invention mainly includes the following steps.

A reflection board of the absolute position measurement capacitive grating displacement sensor corresponding to the steps is disposed with a coarse wavelength conversion grating and a medium wavelength conversion grating, and a corresponding transmission board thereof is disposed with a coarse wavelength reception grating and a medium wavelength reception grating. A coarse wavelength, a medium wavelength, and a fine wavelength are used for absolute measurement.

In Step I, a timer of an interface unit starts a measurement unit according to a preset measurement frequency.

In Step II, displacement of a measured position in the coarse wavelength is determined.

A sensor drive signal (before XOR modulation) sweeping a transmission grating pitch at constant speed with a time period of T according to a time t may be represented as:

$$E(x, t) = E_m \sin\left(2\pi \frac{x}{P_t} - 2\pi \frac{t}{T}\right) \quad (a)$$

According to the Fourier series theory, the expression (a) is a fundamental wave component of the following functions:

$$B(x, t) = \begin{cases} 1 & E(x, t) > 0 \\ 0 & E(x, t) \leq 0 \end{cases} \quad (b)$$

Sampling is performed on the signal of the expression (b) with a space period $P_t/N$ and a time period $T/N$ for space x and time t, thereby acquiring a sequence $B(x_m, t_n)$:

$$B(x_m, t_n) = \begin{cases} 1 & \sin\left(2\pi \frac{m}{N} - 2\pi \frac{n}{N}\right) > 0 \\ 0 & \sin\left(2\pi \frac{m}{N} - 2\pi \frac{n}{N}\right) \leq 0 \end{cases} \quad (c)$$

where m and n are integers, $0 \leq m \leq N-1$, and $0 \leq n \leq N-1$.

According to the sampling theorem, when $N \geq 3$, the expression (a) can be regenerated and restored through the discretized signal sequence (c). Therefore, the discrete signal sequence $B(x_m, t_n)$ is used as the sensor drive signal, and a response signal after regenerative filtering is completely equal to that as the expression (a) is used for driving.

Referring to FIG. 9, it is assumed that a drive signal on one pitch $P_t$ of the transmission grating changes according to the expression (a), and $P_t = 3P_r$, a distance between the measured position (that is, a base line of the transmission board) and a base line of the reflection board is x:

$$x = R \times 3P_c + y_0 = S \times 3P_r + x_0 \quad (d)$$

where R and S are integers, $x_0$ is a distance between the base line of the transmission board and a frontier of a reflection grating electrode group consisting of three pitches, and $y_0$ is a distance between the base line of the transmission board and a frontier of a conversion grating electrode group consisting of three pitches.

According to a capacitive voltage division formula, voltages induced on the three conversion electrodes of the coarse wavelength conversion grating are:

$$U_1 = K \int_{-x_0}^{-x_0 + P_r/2} E(x, t)\, dx = U_m \sin\left(2\pi \frac{t}{T} + \frac{5\pi}{6} + 2\pi \frac{x_0}{3P_r}\right) \quad (e)$$

$$U_2 = K \int_{-x_0 + P_r}^{-x_0 + P_r/2} E(x, t)\, dx = U_m \sin\left(2\pi \frac{t}{T} + \frac{5\pi}{6} + 2\pi \frac{x_0}{3P_r} - \frac{2\pi}{3}\right) \quad (f)$$

$$U_3 = K \int_{-x_0 + 2P_r}^{-x_0 + 5P_r/2} E(x, t)\, dx = U_m \sin\left(2\pi \frac{t}{T} + \frac{5\pi}{6} + 2\pi \frac{x_0}{3P_r} - \frac{4\pi}{3}\right) \quad (g)$$

where K is a scale factor, and it is already assumed that $P_t = 3P_r$.

Phase differences between $U_1$, $U_2$, and $U_3$ are $2\pi/3$, which are consistent with physical locations of the electrodes thereof, so that the $U_1$, $U_2$, and $U_3$ can be regarded as results of sampling the variant x through the following function with the period $P_c$.

$$U(x, t) = U_m \sin\left(2\pi \frac{t}{T} + \frac{5\pi}{6} + 2\pi \frac{x_0}{3P_r} - 2\pi \frac{\pi}{3P_c}\right) \quad (h)$$

Therefore, when the fundamental wave component of the received signal is deduced, it may be regarded that voltage distribution on the coarse wavelength conversion grating changes according to the expression (h). Capacitive coupling of the coarse wavelength reception grating and the coarse wavelength conversion grating is performed, and accordingly induced voltages on the two groups of reception electrodes can be acquired:

$$C_1 = K_t \int_{y_0}^{y_0 + 3P_c/2} U(x, t)\, dx \quad (i)$$

$$= C_m \sin\left[\left(2\pi \frac{t}{T} + \frac{\pi}{3} - 2\pi\left(\frac{y_0}{3P_c} - \frac{x_0}{3P_r}\right)\right)\right]$$

$$C_2 = K_t \int_{y_0 + 3P_c/2}^{y_0 + 3P_c} U(x, t)\, dx \quad (j)$$

$$= -C_m \sin\left[\left(2\pi \frac{t}{T} + \frac{\pi}{3} - 2\pi\left(\frac{y_0}{3P_c} - \frac{x_0}{3P_r}\right)\right)\right]$$

where $K_t$ is a scale factor. The fundamental wave signals on the two groups of reception electrodes of the coarse wavelength reception grating have equal sizes and inverted phases.

Therefore, during signal processing, the two received signals are differentiated ($C_1 - C_2$), and the expression (d) is substituted:

$$C_1 - C_2 = 2C_m \sin\left[\left(2\pi \frac{t}{T} + \frac{\pi}{3} - 2\pi\left(\frac{x}{3P_c} - \frac{x}{3P_r}\right)\right)\right] \quad (k)$$

$$= 2C_m \sin\left(2\pi \frac{t}{T} + \frac{\pi}{3} - 2\pi \frac{x}{W_c}\right)$$

where $$W_c = 3\frac{P_r P_c}{P_r - P_c} \quad (l)$$

is the coarse wavelength.

Specifically, determining the displacement in the coarse wavelength includes the following steps.

In Step II-i, the controller of the measurement unit outputs a coarse wavelength measurement signal, and switches the signal selection switch group to a position required for measuring the displacement in the coarse wavelength.

In Step II-ii, the controller outputs the initialization signal, sets the sequential logic of the drive signal generator, the synchronous delay circuit, and the synchronous capture circuit of the measurement unit to a preset initial state, and at the same time designates an address of a storage unit of the coarse wavelength displacement in the RAM.

In Step II-iii, the drive signal generator starts outputting valid sensor drive signals.

The sensor drive signal output by the drive signal generator is a result of XOR modulation of the expression (c).

In Step II-iv, after applying the drive signal for a preset time, and at a preset phase of the drive signal, that is, a preset phase zero point, the synchronous delay circuit allows the addition counter to start counting. The functions of the synchronous delay circuit include setting a phase reference point of the measurement and starting counting only after the signal becomes steady.

In Step II-v, the synchronous capture circuit synchronously captures a counting result of the addition counter at the valid edge of a zero-crossing detection signal, and writes the result into the designated unit of the RAM, which is the displacement of the measured position in the coarse wavelength (with a fixed offset).

The drive signal having wave properties is transferred through the electrode layout of the present invention, two phase-inverted received signals are induced on the two groups of coarse wavelength reception gratings, and a fundamental wave component of the expression (K) below is acquired after differentiating, demodulating, and filtering the two phase-inverted received signals.

$$C_1 - C_2 = 2C_m \sin\left[\left(2\pi \frac{t}{T} + \frac{\pi}{3} - 2\pi\left(\frac{x}{3P_c} - \frac{x}{3P_r}\right)\right)\right] \quad (k)$$
$$= 2C_m \sin\left(2\pi \frac{t}{T} + \frac{\pi}{3} - 2\pi \frac{x}{W_c}\right)$$

where $$W_c = 3\frac{P_r P_c}{P_r - P_c} \quad (l)$$

$W_C$ is the coarse wavelength, and it is already assumed that $P_r = 3P_r$, $C_1$ and $C_2$ are two received signals of the coarse wavelength, and $C_m$ is the amplitude of the fundamental wave component of the received signal of the coarse wavelength.

A time difference between the negative-to-positive zero-crossing point of the signal and the preset phase zero point (the moment that the addition counter starts) is the displacement of the measured position in the coarse wavelength (with the fixed offset), so that the counting result of the addition counter synchronously captured at the valid edge of the zero-crossing detection signal is the displacement of the measured position in the coarse wavelength.

In Step III, the displacement in the medium wavelength is determined.

In Step III-i, the controller outputs a medium wavelength measurement signal, and switches the signal selection switch group to a position required for measuring the displacement in the medium wavelength.

In Step III-ii, the controller outputs the initialization signal, sets the sequential logic of the drive signal generator, the synchronous delay circuit, and the synchronous capture circuit of the measurement unit to a preset initial state, and at the same time designates an address of a storage unit of the medium wavelength displacement in the RAM.

In Step III-iii, the drive signal generator starts outputting valid sensor drive signals.

In Step III-iv, the synchronous delay circuit allows the addition counter to start counting.

In Step III-v, the synchronous capture circuit captures a counting result of the addition counter, and writes the result into the designated unit of the RAM, which is the displacement of the measured position in the medium wavelength (with a fixed offset).

Similar to that in Step II-v, the medium wavelength satisfies:

$$W_m = 3\frac{P_r P_m}{P_r - P_m} \quad (m)$$

In Step IV, displacement in a fine wavelength is determined.

The transmission grating pitch $P_t$ is different from the reflection grating pitch $P_r$. In order to make the fine wavelength $W_f$ satisfy $W_f = P_r$, the application order of the sensor drive signal is required to be adjusted. Referring to an exploded view of electrodes in FIG. 10, A represents conventional three groups of transmission grating electrodes, and when the sensor drive signal is applied orderly, a voltage signal with the wavelength equal to the pitch $P_r$ of the reflection grating is induced on the reflection grating electrode. For each three electrodes in the three groups of transmission grating electrodes represented by A, an electrode is selected, thereby resulting in a layout of electrodes represented by B, the drive signal of the electrode in B is the same as that in A, and the number of the electrodes in B just equals that of a group, so that if signals on three corresponding reflection grating electrodes are superposed, the layout of the electrodes of B is equivalent to a group of transmission gratings with the pitch equal to the pitch $P_r$ of the reflection gratings, and the wavelength of the induced signal is also equal to the pitch $P_r$ of the reflection grating. C is a result of spatial shift of $P_r/8$ (a spatial angle of $\pi/4$) of B, and D is a result of spatial shift of $P_r/4$ (a spatial angle of $\pi/2$) of B, so that the wavelength of an induced signal thereof is the same as that of B, and the phase shifts by $\pi/4$ successively. The spaces of B, C, and D are combined to form E, the pitch of transmission grating electrodes of E is widened to $3P_r = P_t$, the drive signal is the same as that of A, but the application order is already changed into 1-4-7-2-5-8-3-6 or 1-6-3-8-5-2-7-4 (reversed).

In view of the above, with the pitch of the transmission gratings $P_t = 3P_r$, the signal with the wavelength equal to the pitch $P_r$ of the reflection gratings can be induced. The premise is that: (1) the application order of the drive signal is adjusted to be 1-4-7-2-5-8-3-6 or 1-6-3-8-5-2-7-4; and (2) the signals induced on the reflection grating electrodes are superposed. Therefore, when the displacement of the measured position in the fine wavelength is determined, in addition to adjusting the application order of the drive signal, the two groups of electrodes of the coarse wavelength reception grating are also required to be electrically connected (to be joined to form a complete rectangle) to form a group of fine wavelength reception electrodes, and the two groups of electrodes of the medium wavelength reception grating are required to be electrically connected to form another group of fine wavelength reception electrodes (optional), so as to guarantee that the signals induced on the reflection grating electrode can be superposed on the reception grating through the coarse wavelength conversion grating and medium wavelength conversion grating.

After the above processing, an equivalent signal when the expression (a) drives the sensor according to the application order of 1-4-7-2-5-8-3-6 is:

$$E_e(x, t) = E_m \sin\left(2\pi \frac{x}{P_r} - 2\pi \frac{t}{T}\right) \quad (n)$$

In this case, an induced voltage on the two groups of reception electrodes of the fine wavelength is:

$$F_1 = -F_2 \quad (o)$$
$$= K\left[\int_{-x_0}^{-x_0+P_r/2} E_e(x,t)\,dx + \int_{-x_0-P_r/8}^{-x_0-P_r/8+P_r/2} E_e(x,t)\,dx + \int_{-x_0-P_r/4}^{-x_0-P_r/4+P_r/2} E_e(x,t)\,dx\right]$$
$$= F_m \sin\left(2\pi\frac{t}{T} + \frac{3\pi}{4} + 2\pi\frac{x}{P_r}\right)$$

Accordingly, when the sensor is driven according to the application order of 1-6-3-8-5-2-7-4, an induced voltage on the two groups of reception electrodes of the fine wavelength is:

$$F_1 = -F_2 \quad (p)$$
$$= K\left[\int_{-x_0-P_r/8}^{-x_0-P_r/8+P_r/2} E_e(-x,t)\,dx + \int_{-x_0-P_r/4}^{-x_0-P_r/4+P_r/2} E_e(-x,t)\,dx + \int_{-x_0-3P_r/8}^{-x_0-3P_r/8+P_r/2} E_e(-x,t)\,dx\right]$$
$$= F_m \sin\left(2\pi\frac{t}{T} + \pi - 2\pi\frac{x}{P_r}\right)$$

By combining both (o) and (p), a fine wavelength differential signal is:

$$F_1 - F_2 = 2F_m \sin\left(2\pi\frac{t}{T} + \alpha \pm 2\pi\frac{x}{W_f}\right) \quad (q)$$

where $W_f = P_r$, $W_f$ is the fine wavelength, and $\alpha$ is a constant.

Specifically, determining the displacement in the fine wavelength includes the following steps.

In Step IV-i, the controller outputs a fine wavelength measurement signal, and switches the signal selection switch group to a position required for measuring the displacement in the fine wavelength.

In Step IV-ii, the controller outputs the initialization signal, sets the sequential logic of the drive signal generator, the synchronous delay circuit, and the synchronous capture circuit of the measurement unit to a preset initial state, and at the same time designates an address of a storage unit of the fine wavelength displacement in the RAM.

In Step IV-iii, the drive signal generator starts outputting a valid sensor drive signal, and in order to synthesize a required received signal, the application order thereof is changed from 1-2-3-4-5-6-7-8 during coarse/medium wavelength measurement when N=8 and $P_r$=3$P_r$ to 1-6-3-8-5-2-7-4 (reversed) or 1-4-7-2-5-8-3-6.

In Step IV-iv, the synchronous delay circuit allows the addition counter to start counting.

In Step IV-v, the synchronous capture circuit captures a counting result of the addition counter, and writes the result into the designated unit of the RAM, which is the displacement of the measured position in the fine wavelength (with a fixed offset).

The two groups of reception electrodes of the coarse wavelength are shorted by the switch to serve as a group of reception electrodes of the fine wavelength. The two groups of reception electrodes of the medium wavelength are shorted by the switch to serve as another group of reception electrodes of the fine wavelength. After the application order is adjusted, the drive signals induce two phase-inverted received signals at the two groups of reception electrodes, and a fundamental wave component of the following expression (q) is acquired after differentiating, demodulating, and filtering the two phase-inverted received signals:

$$F_1 - F_2 = 2F_m \sin\left(2\pi\frac{t}{T} + \alpha \pm 2\pi\frac{x}{W_f}\right) \quad (q)$$

where $W_f$ is the fine wavelength, $W_f = P_r$, $F_1$ and $F_2$ are two received signals of the fine wavelength, and $F_m$ is the amplitude of the fundamental wave component of the received signal of the fine wavelength.

A time difference between a negative-to-positive zero-crossing point of the signal and a preset phase zero point (the moment that the addition counter starts counting) is the displacement of the measured position in the fine wavelength (with a fixed offset).

In Step V, the controller requests the interface unit to perform subsequent processing.

In Step VI, the interface unit turns off the measurement circuit after reading displacement data saved in the RAM of the measurement unit.

In Step VII, the interface unit performs processing and displays a measurement result.

When the displacements of the measured position in the coarse, medium, and fine wavelengths are determined, the distances between the measured positions and the measurement reference point in the coarse, medium, and fine wavelengths are determined accordingly. It is assumed that the distances between the measured position and the measurement reference point in the coarse, medium, and fine wavelengths respectively are $x_c$, $x_m$, and $x_f$, the coarse, medium, and fine wavelengths respectively are $W_c$, $W_m$, and $W_f$, the number of each wavelength being divided is $2^M$, and the measured length x is represented as:

$$x \approx x_c \frac{W_c}{2^M} \approx K_m W_m + x_m \frac{W_m}{2^M} \approx K_m W_m + K_f W_f + x_f \frac{W_f}{2^M} \quad (r)$$

where $K_m$ and $K_f$ are integers, $K_m$ represents the number of the medium wavelengths, and $K_f$ represents the number of the fine wavelengths.

Therefore the measured length of the highest measurement precision is:

$$x \approx K_m W_m + K_f W_f + x_f \frac{W_f}{2^M} \quad (s)$$

the preferred parameters when the resolution is 0.01 mm are substituted: $W_c$=256$W_f$, $W_m$=16$W_f$, $W_f$=2.56 mm, and $2^8$=256:

$$x \approx [(16K_m + K_f) \times 256 + x_f] \times 0.01 \text{ mm}.$$

The sequence of Steps II, III, and IV for determining the displacements in the coarse, medium, and fine wavelengths is arbitrary.

The absolute position measurement capacitive grating displacement measurement method of the present invention has the following advantages.

1. With excitation of a sensor drive signal having wave properties, displacement information is changed into an initial phase of a time fundamental wave, displacement of a measured position in each wavelength can be determined through simple zero-crossing detection and an addition counter, so A/D conversion and linear approximation are not required anymore, at the same time the low-efficient method of repeated probing is abandoned, the control is convenient, and the implementation is easy.

2. With excitation of a sensor drive signal having wave properties, the received signal is converted into a periodic waveform of time, a harmonic component can be eliminated through a low-pass filter (second-order or above), so that no complex sine waveform reception electrode is required, and at the same time the length of the fine wavelength may be increased appropriately to increase a signal to noise ratio (for example, a pitch of 2.56 mm is adopted when the resolution is 0.01 mm).

The absolute position measurement capacitive grating displacement sensor and the operating method thereof of the present invention have the following advantages.

1. With excitation of a sensor drive signal having wave properties generated by a twisted-ring counter or a ROM, displacement information is changed into an initial phase of a time fundamental wave of a received signal, displacement of a measured position in each wavelength is determined through simple zero-crossing detection and an addition counter, the circuit is simple, the control is convenient, and the implementation is easy.

2. A harmonic component in a received signal is eliminated through a low-pass filter (second-order or above), a rectangular reception electrode that can be easily fabricated may be selected to greatly decrease the fabrication difficulty, and at the same time measurement errors are reduced, so that the length of the fine wavelength may be increased appropriately to increase a signal to noise ratio (for example, a pitch of 2.56 mm is adopted when the resolution is 0.01 mm).

3. Since intermittently operated multi-wavelength positioning is adopted, defects of the incremental type measurement are overcome, the power consumption is low, and a measurement speed is not limited.

4. A displacement amount in each wavelength is determined by hardware in a mutually independent manner, so not only processing is simplified, but also the problem of non-convergence of software algorithms is solved.

5. Determination of displacements of a measured position in coarse, medium, and fine wavelengths shares the same measurement circuit and method, all processing is performed orderly, no circulation or repetition is required, and the control is simple.

6. No complex MCU is required, the measurement circuit is realized through hardwired logic, system integration is easy to fabricate an Application Specific IC (ASIC), and mass production is possible, so that a handheld measurement tool product with a low cost, a small volume, and low power consumption can be obtained.

BRIEF DESCRIPTION OF THE DRAWINGS

The present invention will become more fully understood from the detailed description given herein below for illustration only, and thus are not limitative of the present invention, and wherein.

Symbols in the accompanying drawings are as follows:
1. Transmission board, 1.1 Transmission grating, 1.2 Medium wavelength reception grating, 1.3 Coarse wavelength reception grating, 2. Reflection board, 2.1 Reflection grating, 2.2 Medium wavelength conversion grating, 2.3 Coarse wavelength conversion grating, 3. First frequency divider, 4. Second frequency divider, 5. Drive signal generator, 5.1 Twisted-ring counter, 5.2 Drive sequence selection switch, 5.3 XOR modulator, 6. Signal selection switch group, and 7. Differential amplifier.

DETAILED DESCRIPTION OF THE INVENTION

An embodiment of an absolute position measurement capacitive grating displacement measurement method is as follows.

A sensor drive signal having wave properties excites each electrode of a transmission grating, and is changed into a received signal changing periodically with time after capacitive coupling of the transmission grating and a reflection grating, pitch conversion of the reflection grating and a conversion grating, and capacitive coupling of the conversion grating and a reception grating, and displacement of a measured position in each wavelength is transformed into an initial phase of a time fundamental wave of a received signal. A time difference between a negative-to-positive zero-crossing point of the fundamental wave signal and a preset phase zero point is the displacement of the measured position in a measured wavelength. The time difference is acquired by counting with an addition counter, so the displacement of the measured position in the measured wavelength is acquired.

A first embodiment of an absolute position measurement capacitive grating displacement sensor is as follows.

Figure 1:
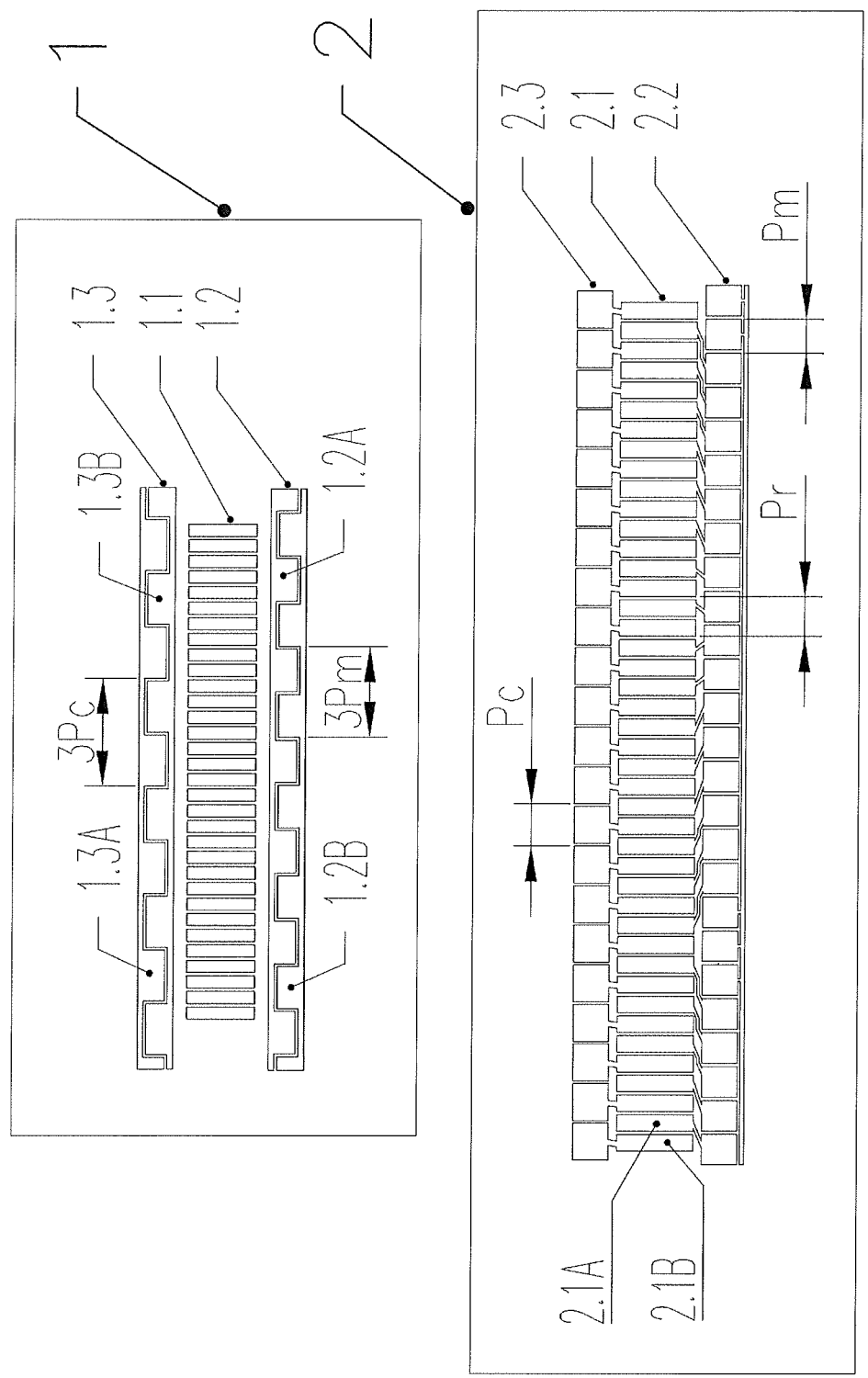
FIG. 1 is a layout diagram of electrodes of an absolute position measurement capacitive grating displacement sensor according to a first embodiment of the present invention.

The first embodiment of the absolute position measurement capacitive grating displacement sensor is a sensor for linear displacement measurement, and provides measurement of a coarse wavelength, a medium wavelength, and a fine wavelength. A layout of the electrodes is shown in FIG. 1, which includes two components capable of moving relative to each other: a transmission board 1 and a reflection board 2. At least one of the transmission board 1 and the reflection board 2 can move along a measurement axis. In this embodiment, the transmission board 1 can move along the measurement axis, and the reflection board 2 is fixed.

In a measurement axis direction on the transmission board 1, a column of periodically arranged transmission grating electrodes 1.1 are disposed, and two columns of periodically arranged reception grating electrodes are further disposed. The two columns of periodically arranged reception grating electrodes respectively are a medium wavelength reception grating 1.2 and a coarse wavelength reception grating 1.3. Each N transmission grating electrodes form a group, in this embodiment, N=8, the electrodes are periodically arranged at intervals of $P_t/8$. The pitch of a group of 8 transmission grating electrodes is $P_t$, $P_t$ is $N_t$ times of the fine wavelength $W_f$, and in this embodiment, $N_t=3$, that is, $P_t=3W_f$.

In the measurement axis direction on the reflection board 2, a column of periodically arranged reflection grating electrodes 2.1 are disposed, and two columns of periodically arranged conversion grating electrodes are further disposed in the measurement axis direction. The two columns of periodically arranged conversion grating electrodes respectively are medium wavelength conversion grating electrodes 2.2 and coarse wavelength conversion grating electrodes 2.3. The reflection grating electrodes are periodically arranged at intervals of $P_r$, and the fine wavelength $W_f$ satisfies $W_f=P_r$. The medium wavelength conversion grating electrodes 2.2 are periodically arranged at intervals of $P_m$. The medium wavelength $W_m$ satisfies $W_m=P_rP_m/(P_r-P_m)$. It is assumed that $W_m=N_mW_f$, $P_t=N_tW_f$, $N_m$ is an integer, and $N_t$ is an odd number between 3 and 7, $P_m=N_mW_f/(N_m+N_t)$, and when $N_m=16$ and $N_t=3$, $P_m=16W_f/19=16P_t/19$. A layout of the coarse wavelength conversion grating electrodes 2.3 is similar to that of the medium wavelength. The coarse wavelength conversion grating electrodes 2.3 on the reflection board 2 are arranged along the measurement axis at intervals of $P_c$ periodically. The coarse wavelength $W_c$ satisfies $W_c=P_rP_c/(P_r-P_c)$. It is assumed that the coarse wavelength $W_c$ satisfies $W_c=N_cW_f$, $N_c$ is an integer, and $N_t$ is an odd number between 3 and 7, the interval $P_c$ of the coarse wavelength conversion grating electrodes 2.3 satisfies $P_c=N_cW_f/(N_c+N_t)$, and when $N_c=256$ and $N_t=3$, $P_c=256W_f/259=256P_t/259$. The reflection grating electrodes 2.1 are divided into two identical groups 2.1A and 2.1B, in which the electrodes are alternately and periodically arranged at intervals of $P_r$. The group of reflection grating electrodes 2.1A is orderly connected to the medium wavelength conversion grating electrodes 2.2. The other group of reflection grating electrodes 2.1B is orderly connected to the coarse wavelength conversion grating electrodes 2.3.

The medium wavelength reception grating electrodes 1.2 of the transmission board 1 are divided into two identical groups 1.2A and 1.2B, in which the electrodes are arranged along the measurement axis at intervals of $3P_m$ alternately and periodically, and the electrodes of the same group are connected to each other by wires. The coarse wavelength reception grating electrodes 1.3 are also divided into two identical groups 1.3A and 1.3B, in which the electrodes are alternately and periodically arranged at intervals of $3P_c$, and the reception grating electrodes of the same group are connected to each other by wires.

The electrodes of the transmission grating, reception grating, transmission grating, and conversion grating are all rectangular. The layout of the each column of electrodes has a common central base line.

The coarse wavelength $W_c$ limits the maximum measurement range of the capacitive grating sensor, and the fine wavelength $W_f$ determines the highest measurement precision of the capacitive grating sensor. When a required ratio $W_c/W_f$ of the coarse wavelength $W_c$ to the fine wavelength $W_f$ is too large, for example, larger than 32, errors easily occur when the integral number of the fine wavelengths included in the measured position is directly determined according to displacement of the coarse wavelength. In this embodiment, the sensor uses the medium wavelength $W_m$ to decrease the ratios of adjacent wavelengths, that is, both $W_c/W_m$ and $W_m/W_f$ are smaller than 32, so measurement of the absolute position in a larger range may occur. According to the absolute position measurement capacitive grating displacement sensor of this embodiment, normally the radio of adjacent wavelengths is preferably 16, that is, $W_c=16W_m$ and $W_m=16W_f$. For example, with the measurement resolution being 0.01 mm and the fine wavelength $W_f=2.56$ mm, the maximum measurement range is $W_c=16W_m=256 W_f=655.36$ mm.

Eight output signals of a drive signal generator 5 are respectively connected to eight electrodes of each transmission grating group, two outputs of the reception gratings are connected to a signal processing circuit.

Figure 2:
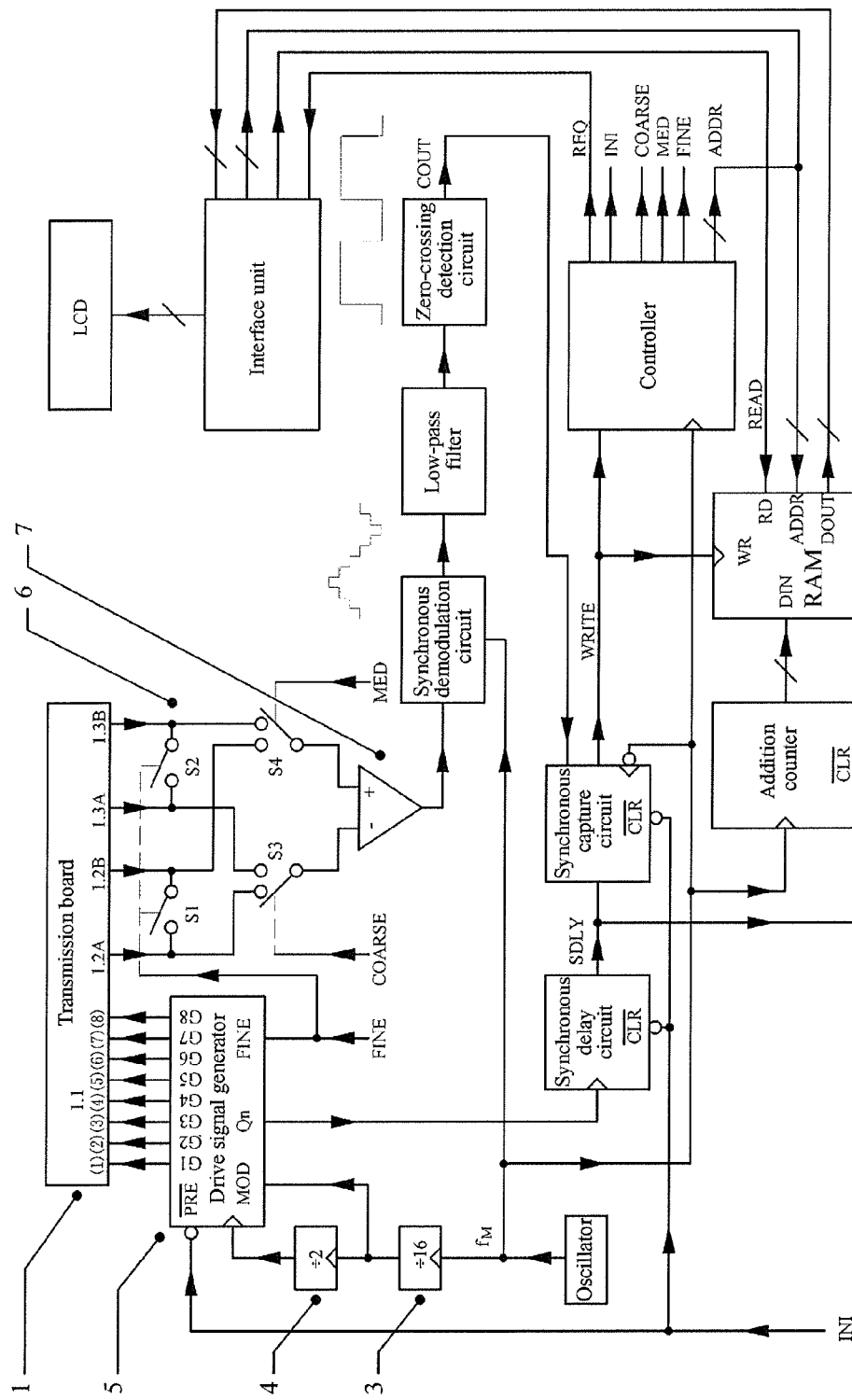
FIG. 2 is a schematic view of a measurement circuit of an absolute position measurement capacitive grating displacement sensor according to the first embodiment of the present invention.

According to this embodiment, a measurement circuit of the absolute position measurement capacitive grating displacement sensor, as shown in FIG. 2, includes an interface unit and a measurement unit. The measurement unit includes an oscillator, a frequency divider, a controller, the drive signal generator 5, and the signal processing circuit. The interface unit includes a timer, a keyboard interface circuit, a measurement interface circuit, an LCD drive circuit, and an ALU. The measurement interface circuit is connected to the controller of the measurement unit and a RAM.

According to this embodiment, the controller is a finite state machine, and generates the following control signals: an initialization signal INI, a fine wavelength measurement signal FINE, a medium wavelength measurement signal MED, a coarse wavelength measurement signal COARSE, a memory address ADDR, and a processing request signal REQ. An input terminal of the controller is connected to an output terminal of a synchronous capture circuit, and receives a signal WRITE output by the synchronous capture circuit, and an input clock thereof is the master clock output by the oscillator. The signals FINE, MED, and COARSE are connected to a control terminal of a signal selection switch group 6 for switching to positions required by corresponding wavelength measurement, the signal INI is connected to the drive signal generator 5, a synchronous delay circuit, and a synchronous capture circuit of the measurement unit for making them in a preset initial state. The ADDR is connected to the RAM to designate a storage address of displacement in each wavelength in the RAM (the signals FINE, MED, and COARSE may also play the role of the ADDR). The signal REQ is connected to the interface unit to notify the interface unit that the measurement is completed and request subsequent processing.

The signal processing circuit of the measurement unit includes an analog processing circuit, a zero-crossing detection circuit, a synchronous delay circuit, an addition counter, a synchronous capture circuit, and a RAM. The analog processing circuit includes the signal selection switch group 6, a differential amplifier 7, a synchronous demodulation circuit, and a low-pass filter. Two outputs of the reception grating of the measured wavelength are connected to the differential amplifier 7 through the signal selection switch group 6, and after differential amplification, are then successively connected to the synchronous demodulation circuit, the low-pass filter, and the zero-crossing detection circuit, and then are input into the synchronous capture circuit.

As shown in FIG. 2, the signal selection switch group 6 includes a first switch $S_1$, a second switch $S_2$, a third switch $S_3$, and a fourth switch $S_4$. An output terminal of the group of electrodes 1.3A of the coarse wavelength reception grating 1.3 and an output terminal of the group of electrodes 1.2A of the medium wavelength reception grating 1.2 are respectively connected to two input terminals of the third switch $S_3$. An output terminal of the other group of electrodes 1.3B of the coarse wavelength reception grating 1.3 and an output terminal of the other group of electrodes 1.2B of the medium wavelength reception grating 1.2 are respectively connected to two input terminals of the fourth switch $S_4$. A common terminal of the third switch $S_3$ is connected to an input terminal of the differential amplifier 7, and a common terminal of the fourth switch $S_4$ is connected to another input terminal of the differential amplifier 7. The first switch $S_1$ is connected to the output terminals of the two groups of electrodes 1.2A and 1.2B of the medium wavelength reception grating 1.2, and the second switch $S_2$ is connected to the output terminals of the two groups of electrodes 1.3A and 1.3B of the coarse wavelength reception grating 1.3.

The oscillator generates the master clock of the measurement unit. The master clock 16 is frequency divided by a first frequency divider 3, and then connected to the sensor drive signal generator to serve as a modulation pulse MOD. Two-way frequency division is performed on the modulation pulse MOD by a second frequency divider 4, and then the modulation pulse MOD is connected to a four-bit twisted-ring counter of the drive signal generator 5 to serve as a counting clock DCLK thereof. Therefore, one wavelength is divided into $16 \times 2 \times 8 = 256 = 2^8$ parts, an 8-bit addition counter may be used to determine the displacement of the measured position in each wavelength. The number of the wavelength being divided into may be determined according to demands, and is preferably a power of 2 for ease of processing. The master clock output by the oscillator is further connected to the controller, the synchronous demodulation circuit, the synchronous capture circuit, and the addition counter. A phase synchronization signal of the drive signal generator 5 is connected to the synchronous delay circuit.

An output of the synchronous delay circuit is connected to the synchronous capture circuit and the addition counter. An output COUT of the zero-crossing detection circuit is connected to the synchronous capture circuit. An output of the synchronous capture circuit is input into the controller and the RAM at the same time. An output of the addition counter serves as a data input of the RAM.

The measurement interface circuit of the interface unit is connected to the controller of the measurement unit and the RAM.

Figure 3:
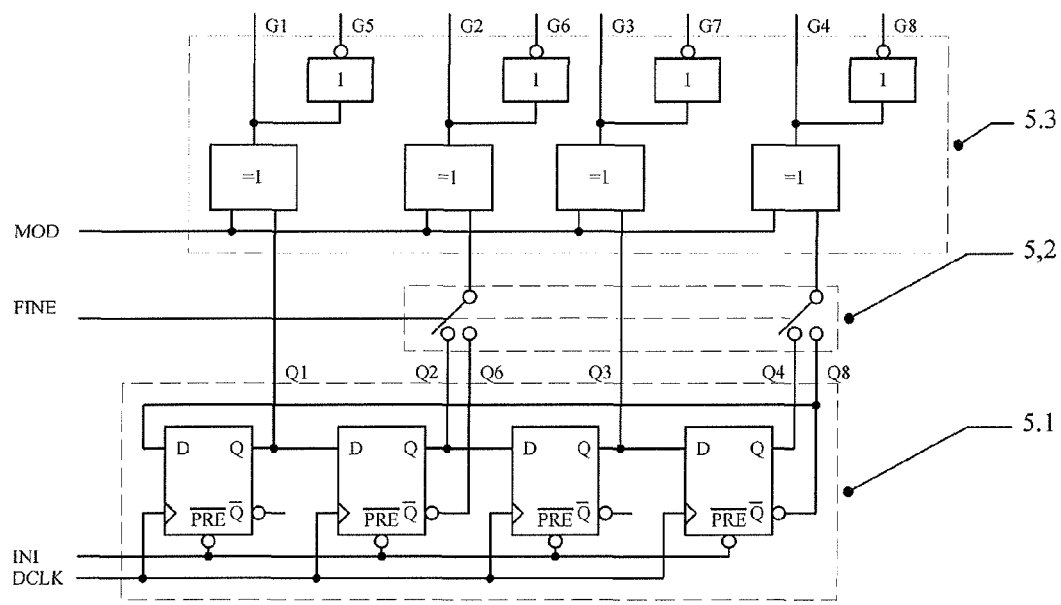
FIG. 3 is a schematic circuit diagram of a solution of a twisted-ring counter of a drive signal generator in FIG. 2.

According to this embodiment, the drive signal generator 5 of the measurement unit, as shown in FIG. 3, mainly includes a twisted-ring counter 5.1, drive sequence selection switches 5.2, and an XOR modulator 5.3. According to this embodiment, the twisted-ring counter 5.1 is a four-bit twisted-ring counter. The eight-way XOR modulator 5.3 includes 4 XOR gates and 4 NOT gates. Eight outputs of the drive signal generator 5 are orderly connected to the eight electrodes of each group of transmission gratings 1.1. For the two drive sequence selection switches 5.2, one is connected to the second XOR gate of the XOR modulator 5.3 and the second output terminal $Q_2$ or the sixth output terminal $Q_6$ ($\overline{Q_2}$) of the twisted-ring counter 5.1; and the other is connected to the fourth XOR gate of the XOR modulator 5.3 and the fourth output terminal $Q_4$ or the eighth output terminal $Q_8$ ($\overline{Q_4}$) of the twisted-ring counter 5.1. During displacement measurement in the coarse wavelength or the medium wavelength, for the two drive sequence selection switches 5.2, one is connected to the second XOR gate of the XOR modulator 5.3 and the second output terminal $Q_2$ of the twisted-ring counter 5.1; and the other is connected to the fourth XOR gate of the XOR modulator 5.3 and the fourth terminal $Q_4$ of the twisted-ring counter 5.1. Outputs $Q_1$ to $Q_4$ of the four-bit twisted-ring counter 5.1 correspond to m=0 to 3 in the expression (c), and outputs $Q_5$ to $Q_8$ (that is, $\overline{Q_1}$ to $\overline{Q_4}$) correspond to m=4 to 7 in the expression (c). The drive signal generator 5 outputs drive signals in an application order of 1-2-3-4-5-6-7-8. During determination of the displacement in the fine wavelength, the FINE=1 output by the controller switches conducting contacts of the two drive sequence selection switches 5.2, one of which is connected to the second XOR gate of the XOR modulator 5.3 and the sixth output terminal $Q_6$ ($\overline{Q_2}$) of the twisted-ring counter, and the other is connected to the fourth XOR gate of the XOR modulator 5.3 and the eighth terminal $Q_8$ ($\overline{Q_4}$) of the twisted-ring counter 5.1. The drive signal generator outputs drive signals in an application order of 1-6-3-8-5-2-7-4. According to this embodiment, the drive signal generator 5 of the measurement unit generates 8 output signals having wave properties, and forms two drive signal application orders required by the coarse/medium wavelength measurement and the fine wavelength measurement to drive the 8 electrodes of each group of the transmission grating.

A second embodiment of an absolute position measurement capacitive grating displacement sensor is as follows.

Figure 4:
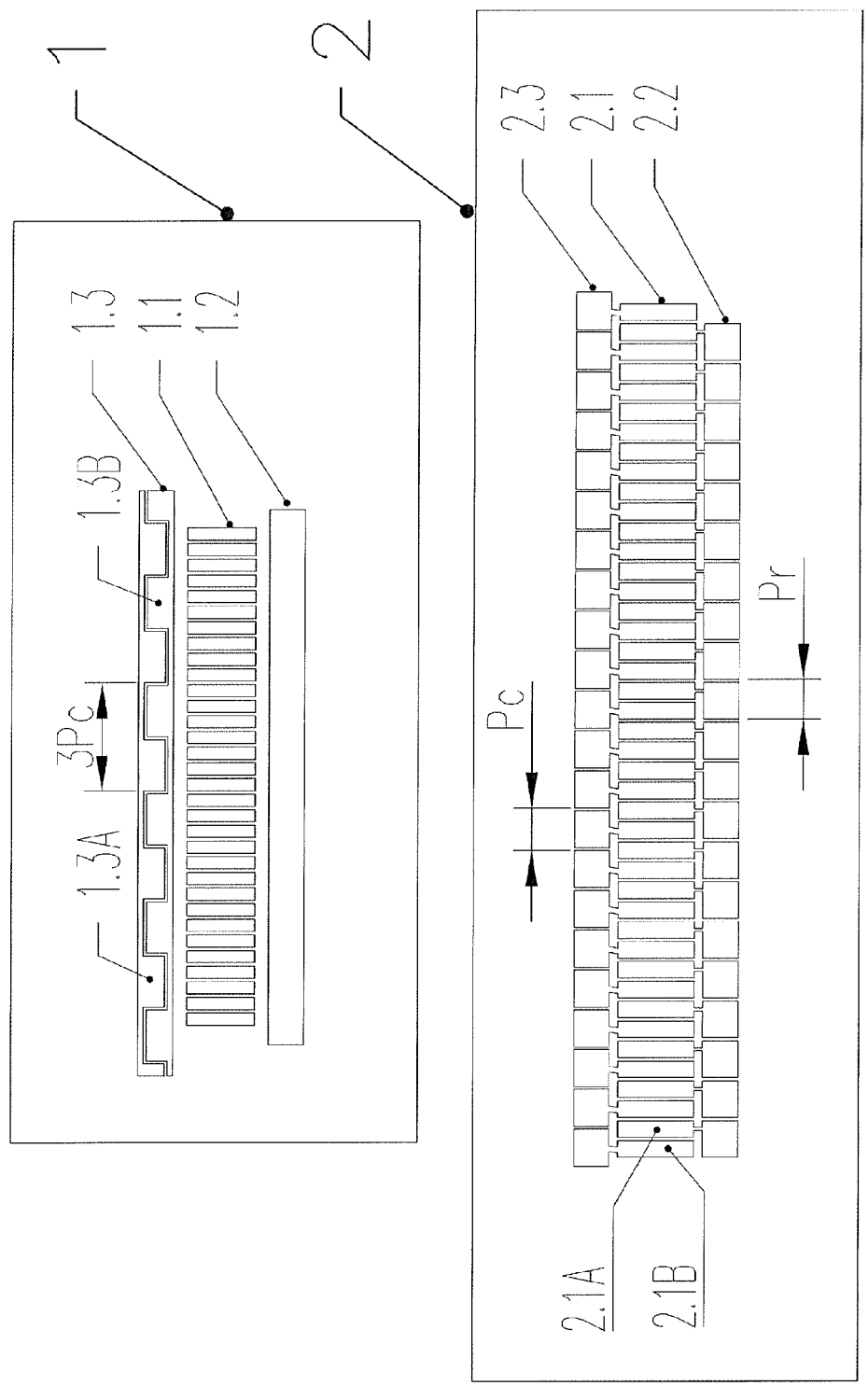
FIG. 4 is a layout diagram of electrodes of an absolute position measurement capacitive grating displacement sensor according to a second embodiment of the present invention.

The second embodiment of the absolute position measurement capacitive grating displacement sensor is a sensor for linear displacement measurement, a layout of electrodes thereof is shown in FIG. 4, and the sensor is used for two-wavelength measurement. A reflection board 2 is disposed with a column of reflection grating electrodes 2.1, a column of coarse wavelength conversion grating electrodes 2.3, and a column of fine wavelength auxiliary conversion grating electrodes 2.2. A transmission board 1 is disposed with a column of transmission grating electrodes 1.1, a column of coarse wavelength reception grating electrodes 1.3, and a column of fine wavelength auxiliary reception grating electrodes 1.2. For the two groups of reflection gratings 2.1, one group is connected to the coarse wavelength conversion grating electrodes 2.3, and the other group is connected to the fine wavelength auxiliary conversion grating electrodes 2.2. The fine wavelength auxiliary conversion grating electrodes 2.2 are periodically arranged with the pitch $P_r = W_f$, and the fine wavelength auxiliary reception grating electrodes 1.2 form a complete rectangle. The coarse wavelength reception grating electrodes 1.3 are divided into two identical groups 1.3A and 1.3B, in which the electrodes are alternately and periodically arranged at intervals of $3P_c$, and the reception grating electrodes of the same group are connected to each other by wires. The rest are the same as those in the first embodiment.

Figure 5:
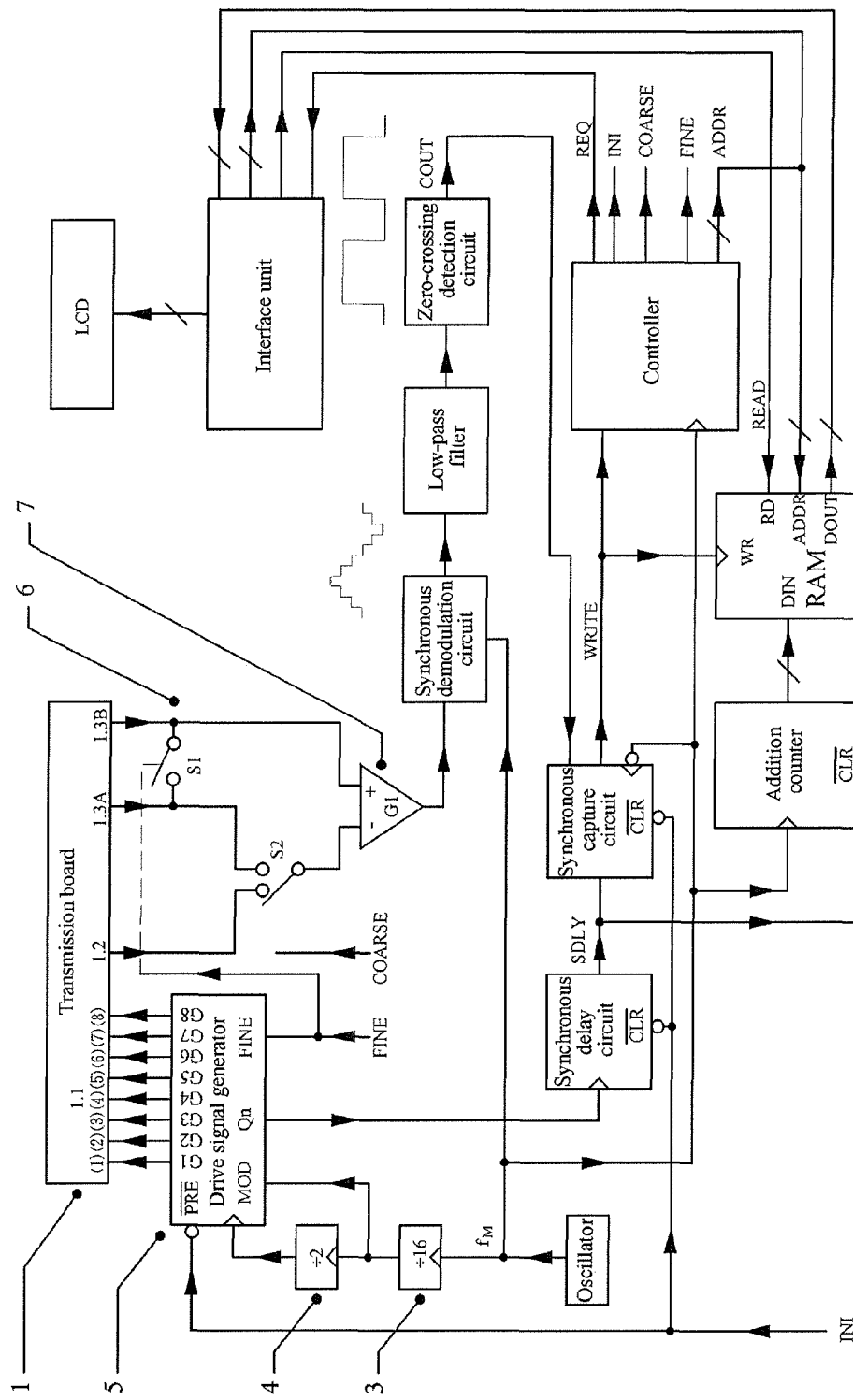
FIG. 5 is a schematic view of a measurement circuit of an absolute position measurement capacitive grating displacement sensor according to the second embodiment of the present invention.

According to this embodiment, a measurement circuit of the absolute position measurement capacitive grating displacement sensor, as shown in FIG. 5, includes an interface unit and a measurement unit. The interface circuit in this embodiment is the same as that in the first embodiment. The measurement unit in this embodiment, similar to that in the first embodiment, includes an oscillator, a frequency divider, a controller, a drive signal generator 5, and a signal processing circuit.

Figure 6:
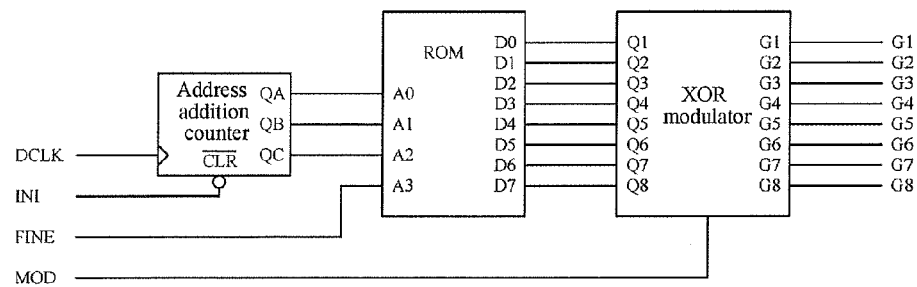
FIG. 6 is a schematic circuit diagram of a solution of a ROM of a drive signal generator in FIG. 5.

The drive signal generator 5 is shown in FIG. 6, and in the circuit, an address addition counter and a ROM replace the twisted-ring counter and the drive sequence selection switch in the first embodiment, and includes the 3-bit address addition counter, the 16-unit 8-bit ROM, and an XOR modulator. Details of data pre-saved in the ROM are shown in Table 1. Outputs $Q_A$ to $Q_C$ of the address addition counter and a control signal FINE together form an input signal of a 4-bit address $A_0$ to $A_3$ of the ROM. An 8-bit output of the ROM after XOR modulation drives the eight electrodes of each group of the transmission gratings. Input signals DCLK, INI, FINE, and MOD of the circuit and realized functions thereof all are the same as those of the drive signal generator in the first embodiment, so the two are interchangeable.

TABLE 1

Table of Pre-saved Data in ROM

| Address | D0 | D1 | D2 | D3 | D4 | D5 | D6 | D7 |
|---------|----|----|----|----|----|----|----|----|
| 0 | 1 | 1 | 1 | 1 | 0 | 0 | 0 | 0 |
| 1 | 0 | 1 | 1 | 1 | 1 | 0 | 0 | 0 |
| 2 | 0 | 0 | 1 | 1 | 1 | 1 | 0 | 0 |
| 3 | 0 | 0 | 0 | 1 | 1 | 1 | 1 | 0 |
| 4 | 0 | 0 | 0 | 0 | 1 | 1 | 1 | 1 |
| 5 | 1 | 0 | 0 | 0 | 0 | 1 | 1 | 1 |
| 6 | 1 | 1 | 0 | 0 | 0 | 0 | 1 | 1 |
| 7 | 1 | 1 | 1 | 0 | 0 | 0 | 0 | 1 |
| 8 | 1 | 0 | 1 | 0 | 0 | 1 | 0 | 1 |
| 9 | 0 | 0 | 1 | 0 | 1 | 1 | 0 | 1 |
| A | 0 | 1 | 1 | 0 | 1 | 0 | 0 | 1 |
| B | 0 | 1 | 0 | 0 | 1 | 0 | 1 | 1 |
| C | 0 | 1 | 0 | 1 | 1 | 0 | 1 | 0 |
| D | 1 | 1 | 0 | 1 | 0 | 0 | 1 | 0 |
| E | 1 | 0 | 0 | 1 | 0 | 1 | 1 | 0 |
| F | 1 | 0 | 1 | 1 | 0 | 1 | 0 | 0 |

The signal processing circuit of this embodiment, as shown in FIG. 5, is similar to that of the first embodiment, which includes an analog processing circuit, a zero-crossing detection circuit, a synchronous delay circuit, an addition counter, a synchronous capture circuit, and a RAM. The analog processing circuit includes a signal selection switch group 6, a differential amplifier 7, a synchronous demodulation circuit, and a low-pass filter. The signal selection switch group 6 of this embodiment includes a first switch $S_1$ and a second switch $S_2$. An output terminal of the fine wavelength auxiliary reception grating electrodes 1.2 and an output terminal of a group of electrodes 1.3A of the coarse wavelength reception grating are respectively connected to two input terminals of the second switch $S_2$. A common terminal of the second switch $S_2$ is connected to an input terminal of the differential amplifier. An output terminal of the other group of electrodes 1.3B of the coarse wavelength reception grating 1.3 is connected to another input terminal of the differential amplifier. The first switch $S_1$ is connected to the output terminals of the two groups of electrodes 1.3A and 1.3B of the coarse wavelength reception grating 1.3.

During coarse wavelength measurement, the controller sends a control signal COARSE=1 and FINE=0 to the signal selection switch group 6, the first switch $S_1$ is switched off, and the second switch $S_2$ is connected to the output terminal of 1.3A. That is to say, the signal selection switch group 6 connects the output terminals of the two groups of electrodes 1.3A and 1.3B of the coarse wavelength reception grating 1.3 to the input terminals of the differential amplifier 7. During fine wavelength measurement, the controller sends a control signal FINE=1 and COARSE=0 to the signal selection switch group 6, the first switch $S_1$ is switched on, the second switch $S_2$ is connected to the output terminal of 1.2, and the first switch $S_1$ joins the two groups of electrodes 1.3A and 1.3B of the coarse wavelength reception grating 1.3 to form a complete rectangle. That is to say, the signal selection switch group 6 connects the joined output terminals of the two groups of electrodes 1.3A and 1.3B of the coarse wavelength reception grating and the output terminal of the electrode of the fine wavelength auxiliary reception grating 1.2 to the input terminal of the differential amplifier 7 to provide two phase-inverted received signals for the fine wavelength measurement.

A third embodiment of an absolute position measurement capacitive grating displacement sensor is as follows.

Figure 7:
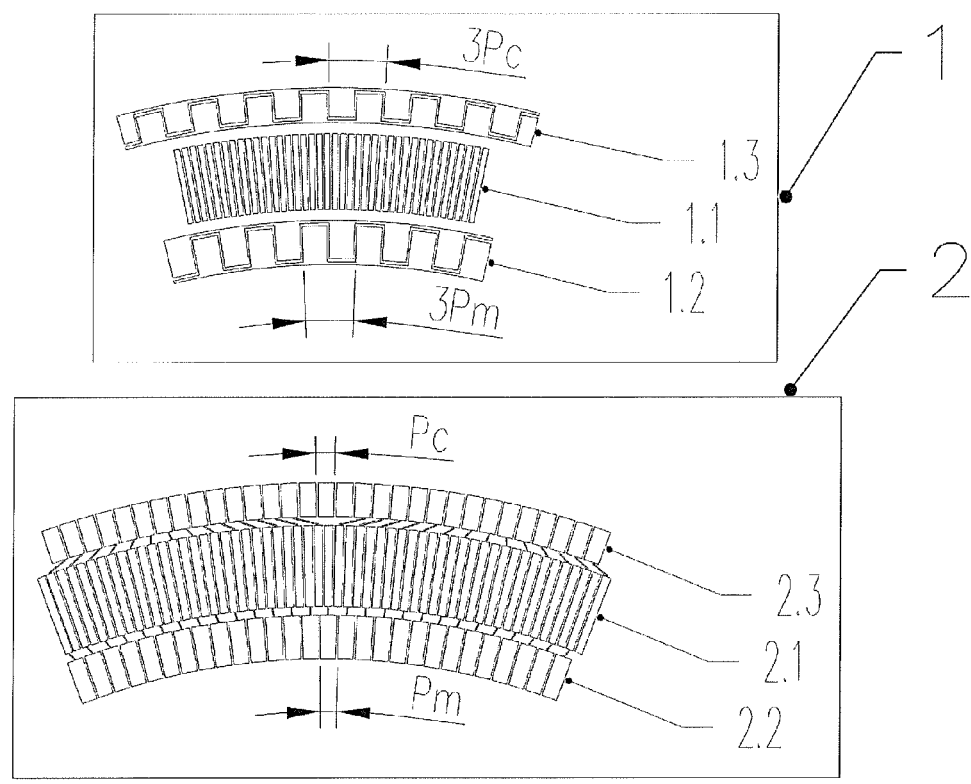
FIG. 7 is a layout diagram of electrodes of an absolute position measurement capacitive grating displacement sensor according to a third embodiment of the present invention.

The absolute position measurement capacitive grating displacement sensor of the third embodiment is a sensor for angular displacement measurement, and a layout of electrodes of the sensor is shown in FIG. 7. Electrodes of a transmission grating, reception grating, reflection grating, and conversion grating are arranged circumferentially in a concentric manner, and the pitches of electrodes are calculated according to a central angle of concentric circles corresponding to the arc of the electrodes. A layout of other electrodes is the same as that in the first embodiment.

A measurement circuit in this embodiment is the same as that in the first embodiment.

A first embodiment of an operating method of an absolute position measurement capacitive grating displacement sensor is as follows.

Figure 8:
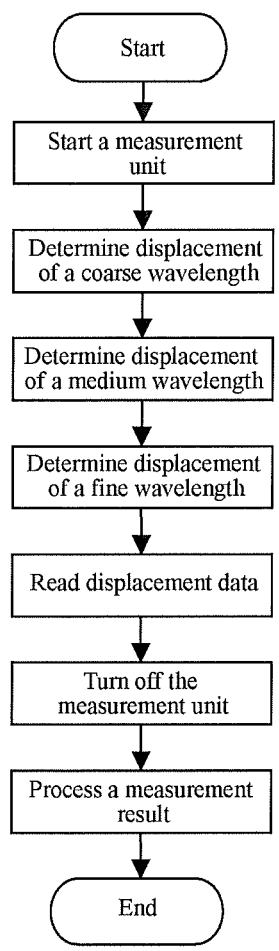
FIG. 8 is a flow chart of an operating method of an absolute position measurement capacitive grating displacement sensor according to a first embodiment of the present invention.
Figure 9:
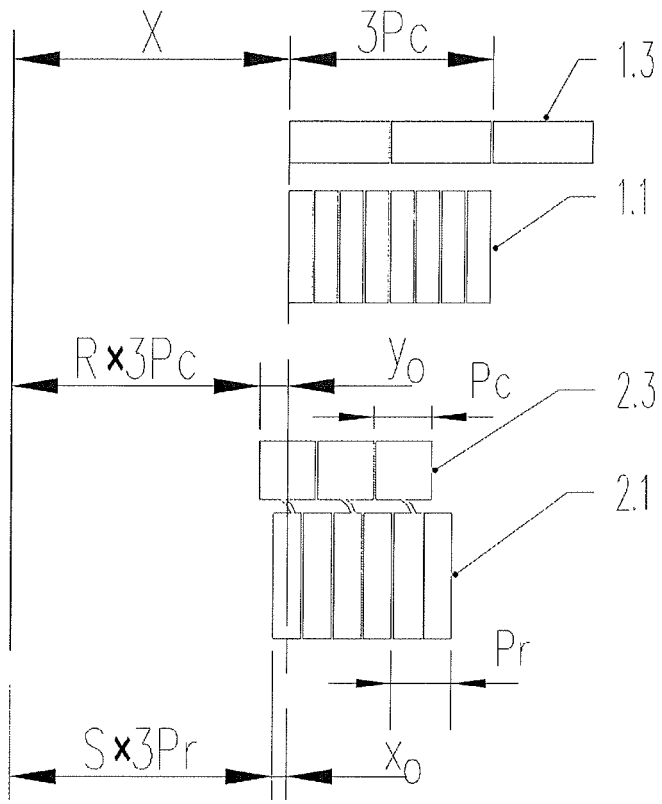
FIG. 9 is a schematic view of relative positions of a measured position x, a group of transmission grating electrodes, and corresponding reflection grating electrodes, conversion grating electrodes, and reception grating electrodes in an operating method of an absolute position measurement capacitive grating displacement sensor of the present invention.
Figure 10:
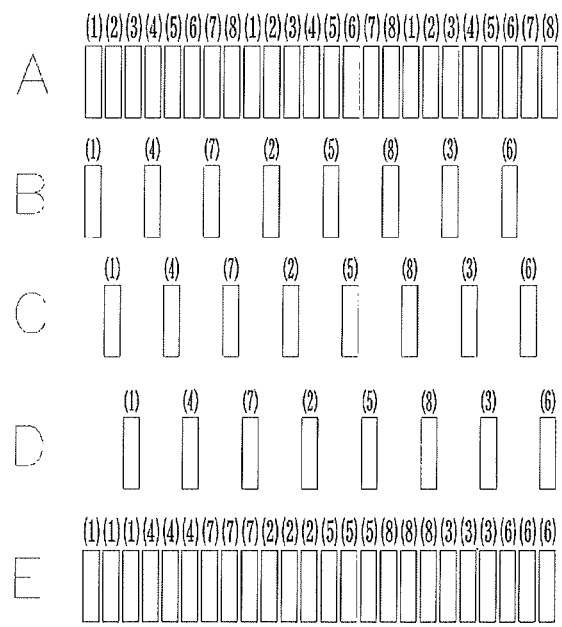
FIG. 10 is an exploded view of transmission grating electrodes of fine wavelength measurement in an operating method of an absolute position measurement capacitive grating displacement sensor of the present invention.
Figure 11:
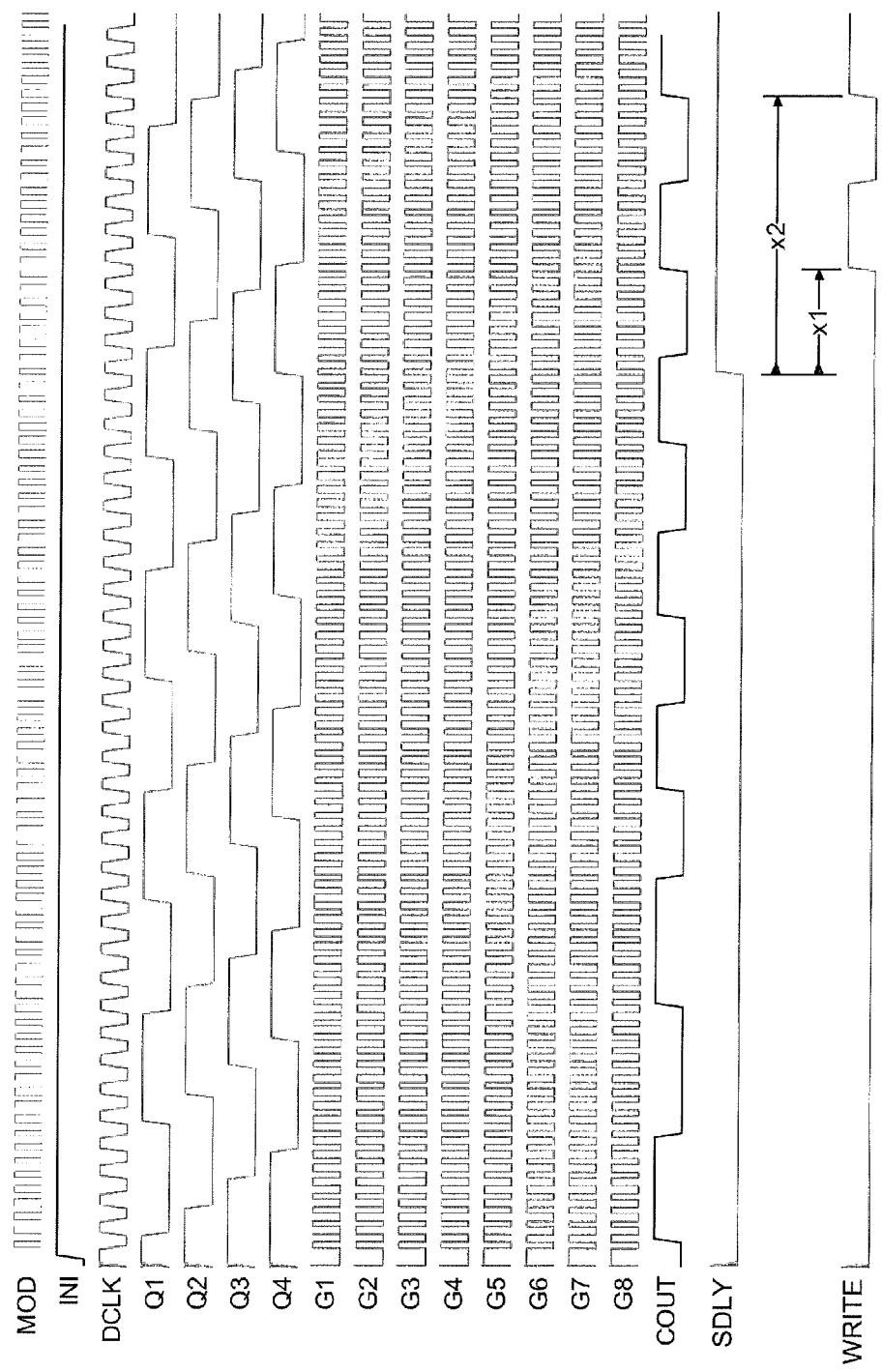
FIG. 11 is an oscillogram of signals in each step of an operating method of an absolute position measurement capacitive grating displacement sensor of the present invention.

The operating method of an absolute position measurement capacitive grating displacement sensor of this embodiment corresponds to the aforementioned first embodiment of the absolute position measurement capacitive grating displacement sensor. The flow chart of this method is shown in FIG. 8, an oscillogram of the signal in all steps is shown in FIG. 11, and the method mainly includes the following steps.

In Step I, a timer of an interface unit starts a measurement unit according to a preset measurement frequency.

In Step II, displacement in a coarse wavelength is determined.

In Step II-i, a controller of the measurement unit outputs a coarse wavelength measurement signal COARSE=1, MED=0, and FINE=0, and switches the signal selection switch group 6 to a position required for measuring the displacement in the coarse wavelength: first and second switches $S_1$ and $S_2$ are switched off, the third switch $S_3$ is connected to an output terminal of 1.3A, and a fourth switch $S_4$ is connected to an output terminal of 1.3B. That is to say, the signal selection switch group connects the output terminals of the two groups of electrodes 1.3A and 1.3B of a coarse wavelength reception grating 1.3 to an input terminal of a differential amplifier.

In Step II-ii, the controller outputs an initialization signal INI, and sets the sequential logic of a drive signal generator, a synchronous delay circuit, and a synchronous capture circuit of the measurement unit all to a preset initial state. The initialization signal INI of the controller clears an output SDLY of the synchronous delay circuit to zero. The low level SDLY makes the addition counter stay in a zero-clearing state. The initialization signal INI further clears an output WRITE of the synchronous capture circuit to zero. Meanwhile, the controller further outputs an ADDR signal to designate an address of a storage unit of the coarse wavelength displacement in a RAM.

In Step II-iii, the drive signal generator starts outputting valid sensor drive signals.

In this embodiment, the drive signal generator mainly includes a twisted-ring counter, drive sequence selection switches, and an XOR modulator.

A signal generated by the twisted-ring counter is shown in an expression (c).

$$B(x_m, t_n) = \begin{cases} 1 & \sin\left(2\pi\frac{m}{8} - 2\pi\frac{n}{8}\right) > 0 \\ 0 & \sin\left(2\pi\frac{m}{8} - 2\pi\frac{n}{8}\right) \leq 0 \end{cases} \quad (c)$$

For the two drive sequence selection switches, one is connected to a second XOR gate and a second output terminal $Q_2$ of the twisted-ring counter; and the other is connected to a fourth XOR gate and a fourth terminal $Q_4$ of the twisted-ring counter. An application order of the output signals of the drive signal generator after XOR modulation of $B(x_m,t_n)$ is 1-2-3-4-5-6-7-8. Output signals $G_1$ to $G_8$ of the drive signal generator are drive signals of this sensor.

After capacitive coupling of the transmission grating and the reflection grating, pitch conversion of the reflection grating and the conversion grating, and capacitive coupling of the conversion grating and the reception grating are performed on the drive signal having wave properties, two received signals output by the reception grating electrode of the coarse wavelength is regenerated and restored to a fundamental wave signal changing periodically with time as described by an expression (k) (referring to the summary part of the present invention) after being processed by the differential amplifier, a synchronous demodulation circuit, and a low-pass filter of an analog processing circuit. The fundamental wave signal transforms the displacement of a measured position in the coarse wavelength into an initial phase thereof.

In Step II-iv, after applying the drive signal for a preset time, and at a preset phase of the drive signal, that is, a preset phase zero point, the synchronous delay circuit allows the addition counter to start counting.

The fourth terminal $Q_4$ (alternatively, other output terminals may be selected, which is represented by $Q_n$ in the following) of the twisted-ring counter of the drive signal generator is used as an input clock of the synchronous delay circuit. After a preset drive cycle $N_D T$ ($N_D \geq 3$, preferably $N_D = 4$, $T = 2^M / f_M$, $2^M$ is the number of the wavelength being divided, and $f_M$ is the frequency of the master clock), the valid SDLY (high level) is output, so that the addition counter is allowed to start counting for the master clock. A rising edge of the selected $Q_n$ is the preset phase zero point, and the delay time $N_D T$ is used for waiting for the signal to be steady.

In Step II-v, the synchronous capture circuit synchronously captures a counting result of the addition counter at the valid edge of a zero-crossing detection signal, and writes the result into the designated unit of the RAM, which is the displacement of the measured position in the coarse wavelength (with a fixed offset).

The zero-crossing detection circuit transforms the fundamental wave signal obtained after processing by the analog processing circuit into a square-wave signal COUT for ease of digital processing. A valid edge of the square-wave signal corresponds to a negative-to-positive zero-crossing point of the fundamental wave signal, so that a time difference between the valid edge of the square-wave signal and the preset phase zero point represents the displacement of the measured position in the coarse wavelength (with a fixed offset). The time difference may be measured by the addition counter.

The drive signal having wave properties is transferred through the electrode layout of the present invention, two phase-inverted received signals $C_1$ and $C_2$ are induced on the two groups of coarse wavelength reception gratings, and a fundamental wave component of the expression (k) is acquired after differentiating, demodulating, and filtering the two phase-inverted received signals $C_1$ and $C_2$.

$$C_1 - C_2 = 2C_m \sin\left[\left(2\pi\frac{t}{T} + \frac{\pi}{3} - 2\pi\left(\frac{x}{3P_c} - \frac{x}{3P_r}\right)\right)\right] \quad (k)$$
$$= 2C_m \sin\left(2\pi\frac{t}{T} + \frac{\pi}{3} - 2\pi\frac{x}{W_c}\right)$$

where $$W_c = 3\frac{P_r P_c}{P_r - P_c}, \quad (1)$$

and $W_C$ is the coarse wavelength, and $P_t = 3P_r$.

The displacement of the measured position in the coarse wavelength (with the fixed offset) is acquired according to a time difference between the negative-to-positive zero-crossing point of the signal and the preset phase zero point (the moment that the addition counter starts counting), so that the counting result of the addition counter synchronously captured at the valid edge of the zero-crossing detection signal is the displacement of the measured position in the coarse wavelength ($x_1$ and $x_2$ in FIG. 11 are equal after modulo of $2^M$).

The initialization signal INI clears the output WRITE of the synchronous capture circuit to zero. Only when the output SDLY of the synchronous delay circuit is valid (high level), the valid edge (the rising edge) of the output COUT of the zero-crossing detection circuit triggers a valid WRITE signal at a non-counting edge (a falling edge) of the master clock. The valid edge (the rising edge) of the WRITE signal writes the counting result of the addition counter into a designated unit of the RAM, which is the displacement of the measured position in the coarse wavelength (with a fixed offset).

When the valid edge (the rising edge) of the WRITE signal jumps, it represents that the measurement of the current wavelength is completed, and accordingly the controller performs state transition according to a set order. In this embodiment, the set order is COARSE→MED→FINE→REQ, and the order of the displacement measurement in the coarse wavelength, the medium wavelength, and the fine wavelength can be chosen optionally.

In Step III, the displacement in the medium wavelength is determined.

In Step III-i, the controller outputs a medium wavelength measurement signal COARSE=0, MED=1, and FINE=0, and switches the signal selection switch group 6 to a position required for measuring the displacement in the medium wavelength. The first and second switches $S_1$ and $S_2$ are switched off, the third switch $S_3$ is connected to the output terminal of 1.2A, and the fourth switch $S_4$ is connected to the output terminal of 1.2B. That is to say, the signal selection switch group 6 connects the output terminals of the two groups of electrodes 1.2A and 1.2B of a medium wavelength reception grating 1.2 to the input terminal of the differential amplifier.

In Step III-ii, the controller outputs an initialization signal INI, sets a sequential logical circuit of the measurement unit to a preset initial state, and at the same time designates an address of a storage unit of the medium wavelength displacement in the RAM.

In Step III-iii, the drive signal generator starts outputting valid sensor drive signals $G_1$ to $G_8$.

In Step III-iv, the synchronous delay circuit allows the addition counter to start counting.

In Step III-v, the synchronous capture circuit captures a counting result of the addition counter, and writes the result into the designated unit of the RAM, which is the displacement of the measured position in the medium wavelength (with a fixed offset).

Similar to that in Step II-v, the medium wavelength satisfies:

$$W_m = 3\frac{P_r P_m}{P_r - P_m} \qquad (m)$$

In Step IV, displacement in a fine wavelength is determined.

In Step IV-i, the controller outputs a fine wavelength measurement signal COARSE=0, MED=0, and FINE=1, and switches the signal selection switch group 6 to a position required for measuring the displacement in the fine wavelength. The first and second switches $S_1$ and $S_2$ are switched on, the third switch $S_3$ is connected to the output terminal of 1.2A, and the fourth switch $S_4$ is connected to the output terminal of 1.3B. The first switch $S_1$ joins the two groups of electrodes 1.3A and 1.3B of the coarse wavelength reception grating 1.3 to form a complete rectangle, and the second switch $S_2$ joins the two groups of electrodes 1.2A and 1.2B of the medium wavelength reception grating 1.2 to form a complete rectangle. That is to say, the signal selection switch group 6 connects the joined output terminal of the two groups of electrodes 1.3A and 1.3B of the coarse wavelength reception grating 1.3 and the joined output terminal of the two groups of electrodes 1.2A and 1.2B of the medium wavelength reception grating 1.2 to the input terminal of the differential amplifier to provide two phase-inverted received signals for the fine wavelength measurement.

In Step IV-ii, the controller outputs the initialization signal INI, sets the sequential logical circuit of the measurement unit to a preset initial state, and at the same time designates an address of a storage unit of the fine wavelength displacement in the RAM.

In Step IV-iii, the drive signal generator starts outputting valid sensor drive signals.

The control signal FINE=1 switches conducting contacts of the two drive sequence selection switches of the drive signal generator, one of which is connected to the second XOR gate and the sixth output terminal $Q_6$ ($\overline{Q_2}$) of the twisted-ring counter, and the other is connected to the fourth XOR gate and the eighth terminal $Q_8$ ($\overline{Q_4}$) of the twisted-ring counter. The acquired application order of the drive signals of the fine wavelength is 1-6-3-8-5-2-7-4. The eight outputs $G_1$ to $G_8$ after XOR modulation drive the eight electrodes of each group of the transmission gratings.

In Step IV-iv, the synchronous delay circuit allows the addition counter to start counting.

In Step IV-v, the synchronous capture circuit captures a counting result of the addition counter, and writes the result into the designated unit of the RAM, which is the displacement of the measured position in the fine wavelength (with a fixed offset).

The two groups of reception electrodes of the coarse wavelength are shorted by the switch to serve as a group of reception electrodes of the fine wavelength. The two groups of reception electrodes of the medium wavelength are shorted by the switch to serve as another group of reception electrodes of the fine wavelength. After the application order is adjusted, the drive signals induce two phase-inverted received signals at the two groups of reception electrodes, and a fundamental wave component of the following expression is acquired after differentiating, demodulating, and filtering the two phase-inverted received signals.

$$F_1 - F_2 = 2F_m \sin\left(2\pi\frac{t}{T} + \alpha \pm 2\pi\frac{x}{W_f}\right) \qquad (q)$$

where $W_f$ is the fine wavelength, $W_f = P_r$, and $\alpha$ is a constant.

A time difference between a negative-to-positive zero-crossing point of the signal and a preset phase zero point (the moment that the addition counter starts counting) is the displacement of the measured position in the fine wavelength (with a fixed offset).

In Step V, the controller requests the interface unit to perform subsequent processing.

In Step VI, the interface unit turns off the measurement circuit after reading displacement data of each wavelength saved in the RAM of the measurement unit.

In Step VII, the interface unit performs processing, and displays a measurement result.

When the displacements of the measured position in the coarse, medium, and fine wavelengths are determined, the distances between the measured positions and a measurement reference point in the coarse, medium, and fine wavelengths are determined accordingly. It is assumed that the distances between the measured positions and the measurement reference point in the coarse, medium, and fine wavelengths respectively are $x_c$, $x_m$, and $x_f$, the coarse, medium, and fine wavelengths respectively are $W_c$, $W_m$, and $W_f$, the number of each wavelength being divided is $2^M$, and the measured length x is represented as:

$$x \approx x_c \frac{W_C}{2^M} \approx K_m W_m + x_m \frac{W_m}{2^M} \approx K_m W_m + K_f W_f + x_f \frac{W_f}{2^M} \qquad (r)$$

where $K_m$ and $K_f$ are integers, $K_m$ represents the number of the medium wavelengths, and $K_f$ represents the number of the fine wavelengths. The expression (r) is two simultaneous equations, which can uniquely determine the two unknown values $K_m$ and $K_f$, so the measured length having the highest measurement precision is:

$$x \approx K_m W_m + K_f W_f + x_f \frac{W_f}{2^M} \quad (s)$$

when the resolution of 0.01 mm is substituted, the preferred parameters are: $W_c=256W_f$, $W_m=16W_f$, $W_f=2.56$ mm, and $2^8=256$:

$$x \approx [(16K_m+K_f) \times 256 + x_f] \times 0.01 \text{ mm}.$$

At last, the interface unit displays the measurement result through an LCD according to requirements of a user.

In view of the above, the two received signals of each wavelength output by the reception grating electrode are input into the differential amplifier through the signal selection switch group. The signal after differentiation and amplification is successively processed by the synchronous demodulation circuit, the low-pass filter, and the zero-crossing detection circuit to be converted into a square-wave signal. The synchronous capture circuit generates a synchronous capture signal according to the square-wave signal and the output of the synchronous delay circuit, captures the counting result of the addition counter at the non-counting edge of the master clock, and writes the result into the designated unit of the RAM. The controller uses the synchronous capture signal to generate the control signal required for measuring the displacement in the next wavelength, or requests the interface unit to perform subsequent processing.

After the measurement unit successively completes the measurement of the displacements of the measured position in the coarse wavelength, the medium wavelength, and the fine wavelength, the controller requests the interface unit to perform subsequent processing. The interface unit turns off the measurement unit immediately after reading the value of the displacement in each wavelength from the RAM of the measurement unit, then calculates an absolute position according to the value of the displacement in each wavelength, performs other conventional processing (such as measurement unit conversion and setting of the measurement reference point) according to requirements (input through the keyboard) of a user, and drives the LCD to display the measurement result.

A second embodiment of an operating method of an absolute position measurement capacitive grating displacement sensor is as follows.

Figure 12:
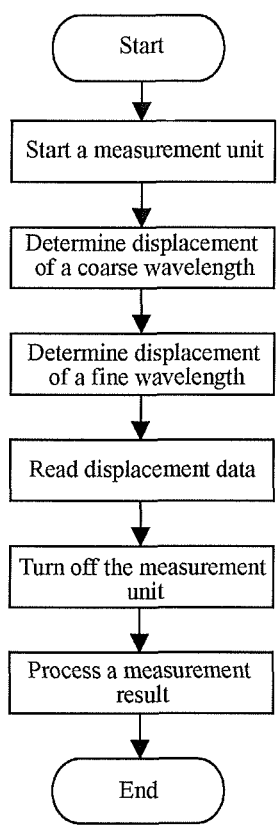
FIG. 12 is a flow chart of an operating method of an absolute position measurement capacitive grating displacement sensor according to a second embodiment of the present invention.

The operating method of the absolute position measurement capacitive grating displacement sensor in this embodiment corresponds to the aforementioned second embodiment of the absolute position measurement capacitive grating displacement sensor. The flow chart of the method is shown in FIG. 12, and the method mainly includes the following steps.

Step I is the same as Step I in the first embodiment.

In Step II, displacement in a coarse wavelength is determined.

In Step II-i, the controller of the measurement unit outputs a coarse wavelength measurement signal, COARSE=1 and FINE=0, the signal selection switch group 6 is switched to a position required for measuring displacement in the coarse wavelength, the switch $S_1$ is turned off, and the switch $S_2$ is connected to the output terminal of the 1.3A.

Step II-ii is the same as Step II-ii in the first embodiment.

In Step II-iii, the drive signal generator starts outputting valid sensor drive signals.

In this embodiment, the drive signal generator mainly includes a ROM, a 3-bit address addition counter, and an XOR modulator.

An output signal of the 3-bit address addition counter and a control signal FINE=0 together serve as a 4-bit read address of the ROM. The ROM outputs data saved in first eight units orderly and repeatedly. After XOR modulation of the 8-bit data $D_0$ to $D_7$ output by the ROM, the drive signal generator outputs sensor drive signals $G_1$ to $G_8$ with the application order being 1-2-3-4-5-6-7-8.

Step II-iv is the same as Step II-iv in the first embodiment.
Step II-v is the same as Step II-v in the first embodiment.

In Step III, displacement in a fine wavelength is determined.

In Step II-i, the controller outputs a fine wavelength measurement signal, COARSE=0 and FINE=1, the signal selection switch group 6 is switched to a position required for measuring displacement in the fine wavelength, the switch $S_1$ is turned on, and the switch $S_2$ is connected to the output terminal of the 1.2.

Step III-ii is the same as Step IV-ii in the first embodiment.

In Step III-iii, the drive signal generator starts outputting valid sensor drive signals.

The output signal of the 3-bit address addition counter and the control signal FINE=1 together serve as the 4-bit read address of the ROM. The ROM outputs data saved in last eight units orderly and repeatedly. After XOR modulation of the 8-bit data $D_0$ to $D_7$ output by the ROM, sensor drive signals $G_1$ to $G_8$ are output with the application order being 1-6-3-8-5-2-7-4.

Step III-iv is the same as Step IV-iv in the first embodiment.
Step III-v is the same as Step IV-iv in the first embodiment.

In Step IV, the controller requests the interface unit to perform subsequent processing.

In Step V, the interface unit turns off the measurement circuit after reading displacement data saved in the RAM of the measurement unit.

In Step VI, the interface unit performs processing, and displays a measurement result.

When the displacements of the measured position in the coarse and fine wavelengths are determined, the distances between the measured positions and a measurement reference point in the coarse and fine wavelengths are determined accordingly. It is assumed that the distances between the measured positions and the measurement reference point in the coarse and fine wavelengths respectively are $x_c$ and $x_f$, the coarse and fine wavelengths respectively are $W_c$ and $W_f$, the number of each wavelength being divided is $2^M$, and the measured length x is represented as:

$$x \approx x_c \frac{W_C}{2^M} \approx K_f W_f + x_f \frac{W_f}{2^M} \quad (r)$$

where $K_f$ is an integer representing the number of the fine wavelengths. Therefore the measured length having the highest measurement precision is:

$$x \approx K_f W_f + x_f \frac{W_f}{2^M} \quad (s)$$

The preferred parameters when the resolution is 0.01 mm are substituted: $W_c=16W_f$, $W_f=2.56$ mm, and $2^8=256$:

$$x \approx (K_f \times 256 + x_f) \times 0.01 \text{ mm}.$$

At last, the interface unit displays the measurement result through the LCD according to the requirements of the user.

A third embodiment of an operating method of an absolute position measurement capacitive grating displacement sensor is as follows.

The operating method of the absolute position measurement capacitive grating displacement sensor in this embodiment corresponds to the aforementioned third embodiment of the absolute position measurement capacitive grating displacement sensor. The operating method of this embodiment is the same as the first embodiment of the operating method, except that relative displacement between the transmission board 1 and the reflection board 2 is generated through rotation of the transmission board 1 and the reflection board 2 with the base point being the same center of the concentric circles.

The aforementioned embodiments are only specific examples for further description of the objectives, technical solutions, and beneficial effects of the present invention in detail, and the present invention is not limited thereto. Any modification, equivalent replacement, and improvement made within the disclosure of the present invention shall fall within the protection scope of the technical solution.

What is claimed is:

1. An absolute position measurement capacitive grating displacement measurement method, comprising:

exciting, by a sensor drive signal having wave properties, each electrode of a transmission grating, wherein the sensor drive signal having wave properties is changed into a received signal changing periodically with time after capacitive coupling of the transmission grating and a reflection grating, pitch conversion of the reflection grating and a conversion grating, and capacitive coupling of the conversion grating and a reception grating, displacement of a measured position in each wavelength is transformed into an initial phase of a time fundamental wave of a received signal, the time difference between a negative-to-positive zero-crossing point of the fundamental wave signal and a preset phase zero point is the displacement of the measured position in a measured wavelength, and the time difference is acquired by counting with an addition counter, so the displacement of the measured position in the measured wavelength is acquired, wherein the method is performed by an absolute position measurement capacitive grating displacement sensor that comprises:

a transmission board;
a reflection board capable of moving relative to each other; and
a measurement circuit,
wherein
a column of periodically arranged electrodes are disposed on the transmission board in a measurement axis direction, which form a transmission grating,
a column of periodically arranged electrodes are disposed on the reflection board in the measurement axis direction, which form a reflection grating,
two columns of periodically arranged electrodes orderly connected to the reflection grating are further disposed on the reflection board, which form a conversion grating,
two columns of periodically arranged electrodes for capacitive coupling with the conversion grating are further disposed on the transmission board, which form a reception grating,
each N electrodes of the transmission grating form a group, N is an integer, 3≤N≤16, the electrodes are periodically arranged at intervals of Pt/N, an electrode pitch of the transmission grating having N electrodes in a group is Pt, Pt is Nt times of a fine wavelength Wf, and Nt is an odd number between 3 and 7, the electrodes of the reflection grating are divided into two groups alternately and periodically arranged at intervals of Pr, where Pr=Wf, the conversion grating electrodes on the reflection board are arranged along the measurement axis at respective intervals periodically, the two groups of electrodes of the reflection grating are orderly connected to the two columns of conversion grating electrodes respectively by wires, the measurement circuit comprises an interface unit and a measurement unit, the interface unit comprises a timer, a keyboard interface circuit, a measurement interface circuit, a display drive circuit, and an Arithmetic Logic Unit (ALU), and the measurement unit comprises a drive signal generator and a signal processing circuit, and wherein the measurement unit further comprises an oscillator, a frequency divider, and a controller, the drive signal generator is a drive signal generator for generating a sensor drive signal having wave properties, a master clock output by the oscillator of the measurement unit is connected to the drive signal generator through the frequency divider, N output signals of the drive signal generator respectively are connected to N electrodes in each group of the transmission grating, the signal processing circuit of the measurement unit comprises: an analog processing circuit, a zero-crossing detection circuit, a synchronous delay circuit, an addition counter, a synchronous capture circuit, and a Random Access Memory (RAM), the analog processing circuit comprises a signal selection switch group, a differential amplifier, a synchronous demodulation circuit, and a low-pass filter, two outputs of the reception grating of the measured wavelength are connected to the differential amplifier through the signal selection switch group, after differential amplification, are then successively connected to the synchronous demodulation circuit, the low-pass filter, and the zero-crossing detection circuit, and then are input into the synchronous capture circuit, the master clock output by the oscillator is further connected to the controller, the synchronous demodulation circuit, the synchronous capture circuit, and the addition counter, a phase synchronization signal of the drive signal generator is connected to the synchronous delay circuit, an output of the synchronous delay circuit is connected to the synchronous capture circuit and the addition counter, an output of the zero-crossing detection circuit is connected to the synchronous capture circuit, an output of the synchronous capture circuit is input into the controller and the RAM at the same time, an output of the addition counter serves as a data input of the RAM, the measurement interface circuit of the interface unit is connected to the controller of the measurement unit and the RAM, outputs of the controller generating various control signals respectively are connected to the RAM, the drive signal generator, the signal selection switch group, and the measurement interface circuit of the interface unit, and an input terminal of the controller is connected to an output terminal of the synchronous capture circuit, and the master clock output by the oscillator is connected to a clock input terminal of the controller.

2. The absolute position measurement capacitive grating displacement sensor according to claim 1, wherein the drive signal generator mainly comprises a twisted-ring counter, a drive sequence selection switch, and an XOR modulator; an output of the oscillator passes through the frequency divider, and then is connected to the drive signal generator to serve as an input clock of the twisted-ring counter and the XOR modulator; the twisted-ring counter generates N output signals having wave properties, and the N output signals having wave properties are input into the XOR modulator through the drive sequence selection switch; and N outputs of the XOR modulator are connected to the N electrodes of each of the groups of the transmission grating.

3. The absolute position measurement capacitive grating displacement sensor according to claim 1, wherein the drive signal generator mainly comprises an address addition counter, a Read-Only Memory (ROM), and an XOR modulator, the master clock output by the oscillator passes through the frequency divider, and then is connected to the address addition counter to serve as a counting clock of the address addition counter; an output of the address addition counter and the fine wavelength measurement signal together form a read address of the ROM, N-bit data output by the ROM is input into the XOR modulator, and after XOR modulation, N outputs are connected to the N electrodes of each group of the transmission grating.

4. The absolute position measurement capacitive grating displacement sensor according to claim 1, wherein the electrodes of the transmission grating, reception grating, reflection grating, and conversion grating are arranged circumferentially in a concentric manner, and the pitch of the electrodes is calculated according to an angle; relative displacement between the transmission board and the reflection board is relative rotation of the transmission board and the reflection board with the base point being the center of the concentric circles.

5. The absolute position measurement capacitive grating displacement sensor according to claim 1, wherein two columns of conversion gratings and two columns of reception gratings are respectively disposed, the two columns of conversion gratings of the reflection board are respectively called a medium wavelength conversion grating and a coarse wavelength conversion grating, the two columns of reception gratings of the corresponding transmission board are respectively called a medium wavelength reception grating and a coarse wavelength reception grating; the electrodes of the medium wavelength conversion grating on the reflection board are arranged along the measurement axis at intervals of Pm periodically; the medium wavelength Wm satisfies Wm=PtPm/(Pr−Pm); it is assumed that Wm=NmWf, Pt=NtWf, Nm is an integer, and Nt is an odd number between 3 and 7, so Pm=NmWf/(Nm+Nt); the electrodes of the medium wavelength reception grating on the corresponding transmission board are divided into two identical groups arranged along the measurement axis at intervals of NtPm alternately and periodically, the reception grating electrodes of the same group are connected to each other by wires; the electrodes of the coarse wavelength conversion grating on the reflection board are arranged along the measurement axis at intervals of Pc periodically; the coarse wavelength We satisfies Wc=PtPc/(Pr−Pc); it is assumed that Wc=NcWf, Pt=NtWf, Nc is an integer, and Nt is an odd number between 3 and 7, the pitch Pc of the electrodes of the coarse wavelength conversion grating satisfies Pc=NcWf/(Nc+Nt); the electrodes of the coarse wavelength reception grating on the corresponding transmission board are also divided into two identical groups arranged at intervals of NtPc alternately and periodically, and the reception grating electrodes of the same group are connected to each other by wires.

6. The absolute position measurement capacitive grating displacement sensor according to claim 5, wherein the signal selection switch group comprises a first switch, a second switch, a third switch, and a fourth switch; an output terminal of the group of electrodes of the coarse wavelength reception grating and an output terminal of the group of electrodes of the medium wavelength reception grating are respectively connected to two input terminals of the third switch, an output terminal of the other group of electrodes of the coarse wavelength reception grating and an output terminal of the other group of electrodes of the medium wavelength reception grating are respectively connected to two input terminals of the fourth switch; a common terminal of the third switch is connected to an input terminal of the differential amplifier, and a common terminal of the fourth switch is connected to another input terminal of the differential amplifier; the first switch is connected to the output terminals of the two groups of electrodes of the medium wavelength reception grating, and the second switch is connected to the output terminals of the two groups of electrodes of the coarse wavelength reception grating.

7. The absolute position measurement capacitive grating displacement sensor according to claim 1, wherein two columns of conversion gratings and two columns of reception gratings are respectively disposed, the two columns of conversion gratings of the reflection board are respectively called a coarse wavelength conversion grating and a fine wavelength auxiliary conversion grating, the two columns of reception gratings of the corresponding transmission board are respectively called a coarse wavelength reception grating and a fine wavelength auxiliary reception grating; the electrodes of the fine wavelength auxiliary conversion grating on the reflection board are arranged along the measurement axis at intervals of Pr, Pr=Wf, periodically; the electrodes of the fine wavelength auxiliary reception grating on the corresponding transmission board form a complete rectangle; the electrodes of the coarse wavelength conversion grating on the reflection board are arranged along the measurement axis at intervals of Pc periodically; the coarse wavelength We satisfies Wc=PtPc/(Pr−Pc); it is assumed that Wc=NcWf, Pt=NtWf, Nc is an integer, and Nt is an odd number between 3 and 7, the pitch Pc of the electrodes of the coarse wavelength conversion grating satisfies Pc=NcWf/(Nc+Nt); the electrodes of the coarse wavelength reception grating on the corresponding transmission board are also divided into two identical groups arranged at intervals of NtPc alternately and periodically, and the reception grating electrodes of the same group are connected to each other by wires.

8. An operating method of an absolute position measurement capacitive grating displacement sensor according to claim 1, wherein the interface unit starts the measurement unit according to a preset measurement frequency, the controller of the measurement unit successively generates various control signals comprising an initialization signal, a displacement measurement signal, a memory address signal, and a processing request signal; and each output is respectively connected to the RAM, the drive signal generator, the signal selection switch group, and the measurement interface circuit of the interface unit;

a sensor drive signal having wave properties generated by the drive signal generator is changed into a received signal changing periodically with time after capacitive coupling of the transmission grating and the reflection grating, pitch conversion of the reflection grating and the conversion grating, and capacitive coupling of the conversion grating and the reception grating, and the displacement of a measured position in the measured wavelength is transformed into an initial phase of a time fundamental wave of a received signal;

two received signals output by the reception grating electrode of the measured wavelength are input into the differential amplifier through the signal selection switch group, after differential amplification, the signals are successively processed by the synchronous demodulation circuit, the low-pass filter, and the zero-crossing detection circuit, and then are converted into a square-wave signal; the synchronous capture circuit generates a synchronous capture signal according to the square-wave signal and the output of the synchronous delay circuit, captures a counting a result of the addition counter at a non-counting edge of the master clock, and writes the result into a designated unit of the RAM; and the controller uses the synchronous capture signal to generate the control signal required for measuring the displacement in the next wavelength, or requests the interface unit to perform subsequent processing;

the synchronous delay circuit controls the counting of the addition counter; only after a valid drive signal is applied for a preset time and at a preset phase of the drive signal, the addition counter is allowed to start counting, and the addition counter performs counting on the master clock output by the oscillator; and after the measurement unit successively completes the measurement of the displacement of the measured position in each wavelength, the controller requests the interface unit to perform subsequent processing; the interface unit turns off the measurement unit immediately after reading the value of the displacement in each wavelength from the RAM of the measurement unit, calculates an absolute position according to the value of the displacement in each wavelength, and displays the measurement result.

9. The operating method of an absolute position measurement capacitive grating displacement sensor according to claim 8, wherein a reflection board of the absolute position measurement capacitive grating displacement sensor is disposed with a coarse wavelength conversion grating and a medium wavelength conversion grating, and a corresponding transmission board is disposed with a coarse wavelength reception grating and a medium wavelength reception grating; a coarse wavelength, a medium wavelength, and a fine wavelength are used for absolute position measurement; and the method mainly comprises:

I. starting, by a timer of an interface unit, a measurement unit according to a preset measurement frequency;

II. determining the displacement of a measured position in the coarse wavelength;

II-i. outputting, by the controller of the measurement unit, a coarse wavelength measurement signal, and switching the signal selection switch group to a position required for measuring the displacement in the coarse wavelength;

II-ii. outputting, by the controller, the initialization signal, setting the sequential logic of the drive signal generator, the synchronous delay circuit, and the synchronous capture circuit of the measurement unit to a preset initial state, and at the same time designating an address of a storage unit of the coarse wavelength displacement in the RAM;

II-iii. starting, by the drive signal generator, outputting valid sensor drive signals;

II-iv. after the drive signal is applied for a preset time, and at a preset phase of the drive signal, that is, a preset phase zero point, allowing, by the synchronous delay circuit, the addition counter to start counting;

II-v. synchronously capturing, by the synchronous capture circuit, a counting result of the addition counter at a valid edge of a zero-crossing detection signal, and writing the result into the designated unit of the RAM, and the result is the displacement of the measured position in the coarse wavelength (with a fixed offset);

III. determining the displacement in the medium wavelength;

III-i. outputting, by the controller, a medium wavelength measurement signal, and switching the signal selection switch group to a position required for measuring the displacement in the medium wavelength;

III-ii. outputting, by the controller, the initialization signal, setting the sequential logic of the drive signal generator, the synchronous delay circuit, and the synchronous capture circuit of the measurement unit to a preset initial state, and at the same time designating an address of a storage unit of the medium wavelength displacement in the RAM;

III-iii. starting, by the drive signal generator, outputting valid sensor drive signals;

III-iv. allowing, by the synchronous delay circuit, the addition counter to start counting;

III-v. capturing, by the synchronous capture circuit, a counting result of the addition counter, and writing the result into the designated unit of the RAM, and the result is the displacement of the measured position in the medium wavelength (with a fixed offset);

IV. determining the displacement in the fine wavelength;

IV-i. outputting, by the controller, a fine wavelength measurement signal, and switching the signal selection switch group to a position required for measuring the displacement in the fine wavelength;

IV-ii. outputting, by the controller, the initialization signal, setting the sequential logic of the drive signal generator, the synchronous delay circuit, and the synchronous capture circuit of the measurement unit to a preset initial state, and at the same time designating an address of a storage unit of the fine wavelength displacement in the RAM;

IV-iii. starting, by the drive signal generator, outputting valid sensor drive signals;

IV-iv. allowing, by the synchronous delay circuit, the addition counter to start counting;

IV-v. capturing, by the synchronous capture circuit, a counting result of the addition counter, and writing the result into the designated unit of the RAM, and the result is the displacement of the measured position in the fine wavelength (with a fixed offset);

V. requesting, by the controller, the interface unit to perform subsequent processing;

VI. turning off, by the interface unit, the measurement circuit after reading displacement data saved in the RAM of the measurement unit; and VII. performing, by the interface unit, processing, and displaying a measurement result; wherein a sequence of Steps II, III, and IV for determining the displacements in the coarse, medium, and fine wavelengths is arbitrary.

* * * * *